United States Patent
Pietromonaco

(10) Patent No.: US 10,742,153 B2
(45) Date of Patent: Aug. 11, 2020

(54) MOTOR DRIVER AND A METHOD OF OPERATING THEREOF

(71) Applicant: ARM Ltd., Cambridge (GB)

(72) Inventor: David Victor Pietromonaco, Cupertino, CA (US)

(73) Assignee: ARM Ltd., Cambridge (GB)

(*) Notice: Subject to any disclaimer, the term of this patent is extended or adjusted under 35 U.S.C. 154(b) by 99 days.

(21) Appl. No.: 15/483,990

(22) Filed: Apr. 10, 2017

(65) Prior Publication Data

US 2018/0294758 A1    Oct. 11, 2018

(51) Int. Cl.

| H02K 19/06 | (2006.01) |
|---|---|
| H02P 25/08 | (2016.01) |
| H02K 19/10 | (2006.01) |
| H02K 3/28 | (2006.01) |
| H02P 21/22 | (2016.01) |
| H02K 3/18 | (2006.01) |
| H02K 11/00 | (2016.01) |
| H02P 25/092 | (2016.01) |

(52) U.S. Cl.
CPC .............. *H02P 25/08* (2013.01); *H02K 3/18* (2013.01); *H02K 3/28* (2013.01); *H02K 11/0094* (2013.01); *H02K 19/103* (2013.01); *H02P 21/22* (2016.02); *H02P 25/092* (2016.02)

(58) Field of Classification Search
USPC ........................... 318/400.26, 790, 252, 748
See application file for complete search history.

(56) References Cited

U.S. PATENT DOCUMENTS

| 5,633,568 | A | 5/1997 | Dunfield et al. |
| 5,889,922 | A | 3/1999 | Bufe et al. |
| 5,923,142 | A | 7/1999 | Li |
| 6,078,161 | A | 6/2000 | Kim et al. |
| 6,339,310 | B1 | 1/2002 | Sugiyama et al. |
| 7,049,786 | B1* | 5/2006 | Toliyat ............ H02P 3/18 318/254.1 |
| 9,419,551 | B2 | 8/2016 | Pietromonaco |
| 2002/0071670 | A1* | 6/2002 | Odaka .......... H05B 41/325 396/206 |
| 2002/0105239 | A1* | 8/2002 | Witzig ............. H02K 3/28 310/68 B |
| 2004/0085040 | A1 | 5/2004 | Chen et al. |
| 2005/0072608 | A1 | 4/2005 | Johnston et al. |

(Continued)

OTHER PUBLICATIONS

Notification of Transmittal of the International Search Report and the Written Opinion of the International Searching Authority, or the Declaration, dated Aug. 3, 2018, International Application No. PCT/GB2018/050947, 1 pg.

(Continued)

*Primary Examiner* — Muhammad S Islam
(74) *Attorney, Agent, or Firm* — Berkeley Law & Technology Group, LLP

(57) ABSTRACT

An electrical motor comprising multiple inductive coils, and a method for using same, is disclosed. The inductive coils may be configured to conduct current bi-directionally. Terminals of the inductive coils may be coupled to a common node on a power bus coupled to a power supply. Current flowing in a first inductive coil from the power bus may be largely offset by current returned to the power bus from a second inductive coil.

20 Claims, 20 Drawing Sheets

(56) References Cited

U.S. PATENT DOCUMENTS

| | | | |
|---|---|---|---|
| 2005/0116679 A1* | 6/2005 | Ramu | H02M 3/1582 318/700 |
| 2007/0031131 A1 | 2/2007 | Griffitts et al. | |
| 2009/0146598 A1 | 6/2009 | Hayashi et al. | |
| 2009/0184677 A1* | 7/2009 | Reddy | H02P 8/34 318/685 |
| 2010/0123426 A1 | 5/2010 | Nashiki et al. | |
| 2011/0181135 A1 | 7/2011 | Pollock et al. | |
| 2013/0076292 A1 | 3/2013 | Okada et al. | |
| 2013/0257188 A1 | 10/2013 | Raminosoa et al. | |
| 2014/0139154 A1 | 5/2014 | Chuang et al. | |
| 2016/0079889 A1 | 3/2016 | Pietromonaco | |
| 2016/0079893 A1* | 3/2016 | Pietromonaco | H02P 6/14 318/254.1 |
| 2016/0250938 A1* | 9/2016 | Lee | B60L 11/1814 307/10.1 |
| 2017/0047881 A1* | 2/2017 | Shimura | H02P 29/50 |
| 2017/0346420 A1* | 11/2017 | Ross | H02P 6/182 |

OTHER PUBLICATIONS

The International Search Report, dated Aug. 3, 2018, International Application No. PCT/GB2018/050947, 4 pgs.

The Written Opinion of the International Searching Authority, dated Aug. 3, 2018, International Application No. PCT/GB2018/050947, 8 pgs.

Response to Official Communication pursuant to Rules 161(1) and 162 EPC dated Nov. 19, 2019, App. No. EP18719247.1, Filed May 14, 2020, 17 Pages.

Acknowledgment of receipt for response to Official Communication pursuant to Rules 161(1) and 162 EPC, App. No. EP18719247.1, Date of receipt May 15, 2020, 2 Pages.

\* cited by examiner

OFFICIAL SENSOR OUTPUT:

| 1 | 2 | 3 |
|---|---|---|
| ON | OFF | OFF |
| ON | ON | OFF |
| OFF | ON | OFF |
| OFF | ON | ON |
| OFF | OFF | ON |
| ON | OFF | ON |

MOTOR DRIVER AND A METHOD OF OPERATING THEREOF

BACKGROUND

1. Field

The present disclosure relates to electrical motors. More particularly, this disclosure relates to coil driver circuitry for an electrical motor.

2. Information

In an electrical motor which has coil windings as part of its stator, such as in a switched reluctance electrical motor, it is common for the electrical motor to be powered by a three phase power supply and to apply AC waveforms to the coil windings to control the operation of the motor. Some electrical motors have been created with more phases, but a significant factor in creating such multi-phase electrical motors is the cost of the phase driver electronics. In conventional motors a pulse width modulation (PWM) voltage controller (typically arranged with an H-bridge topology to drive motor coils bi-directionally) is coupled to a large power supply and the large voltages and currents which are required to drive the motor coils can add significantly to the cost of the driver circuitry. Accordingly, multiple phase motors requiring multiple coil driver circuits are expensive to produce according to contemporary techniques.

Also conventional motors usually only operate at their highest efficiency when operating at full design output power levels. It is known to provide variable output driver circuits to allow a motor to operate at reduced output power levels, but the motor efficiency is then markedly reduced due to a less effective coupling of the smaller magnetic fields. Consequently, to maintain reasonable efficiency such motors must be operated in narrow ranges near their design points, and mechanical gearboxes and transmission systems (even some with multiple motors) must be used to maintain efficiency across a wider range of output levels. Such configurations are both expensive and mechanically complex.

Additionally, a significant portion power supplied to an electrical motor is typically consumed by leakage or ohmic losses. For example, wireless forming inductive coils and wires supplying current from a power supply to the inductive coils typically facilitate ohmic losses that undercut power efficiency and cooling.

SUMMARY

Briefly, particular implementations are directed to an electrical motor comprising: motor driver circuitry; a power bus comprising a common node; a plurality of coils, each coil comprising a first terminal coupled to the motor driver circuitry and a second terminal coupled to the common node; and a power supply comprising a first terminal coupled to the common node and a second terminal coupled to the motor driver circuitry.

Another particular implementation is directed to a method comprising: coupling a voltage source to a common node of a power bus from a first terminal of a power supply; and conducting a bi-directional current between first and second terminals of each of a plurality of coils, first terminals of the plurality of coils being coupled to motor driver circuitry and second terminals of the plurality of coils being coupled to the common node.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
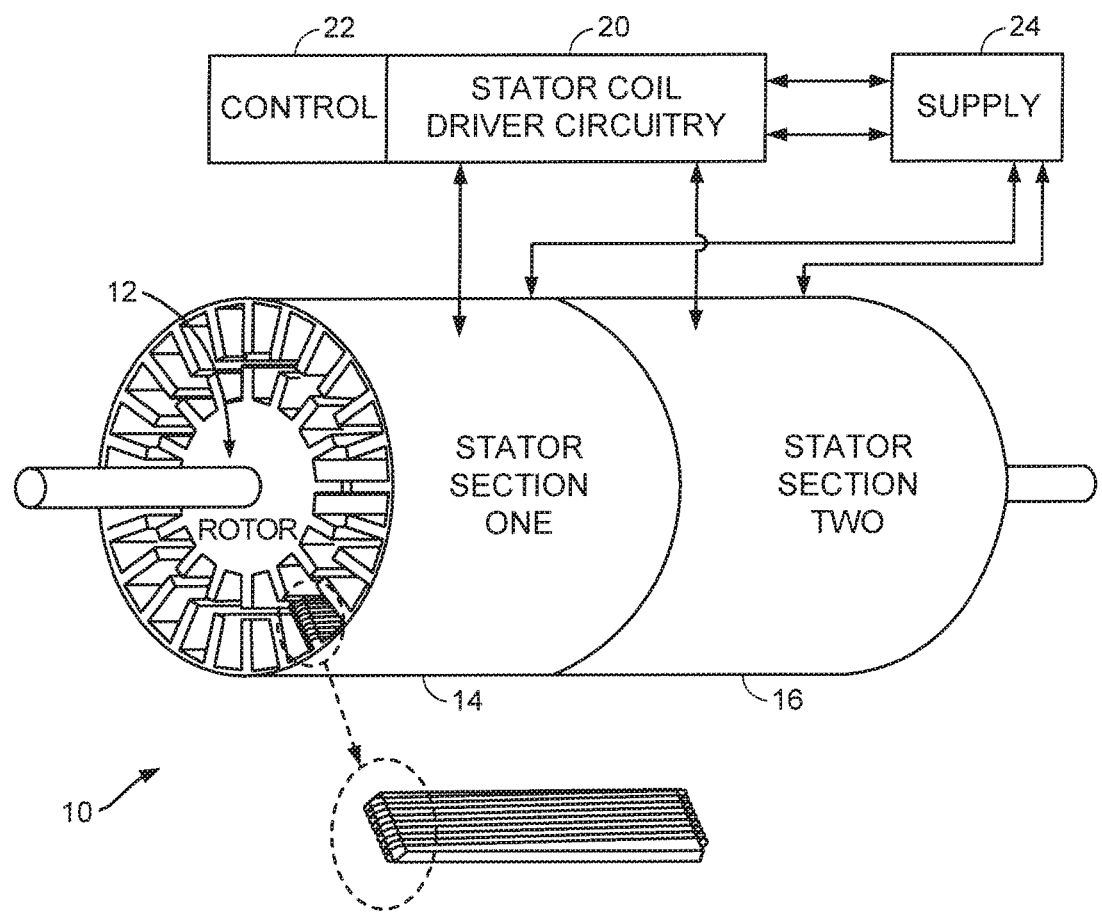
FIG. 1A schematically illustrates a switched reluctance motor having two stator sections in one example embodiment.

Reference is made in the following detailed description to accompanying drawings, which form a part hereof, wherein like numerals may designate like parts throughout that are identical, similar and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

According to an embodiment, an electric motor includes multiple inductive coils that receive power from a power supply. Wires forming the inductive coils and wires furnishing power to the inductive coils from a power supply may introduce ohmic losses that undercut an electric motor's power efficiency and contribute to heating. Particular implementations described herein are directed to reducing such ohmic losses and constructing electric motors from less expensive wiring.

According to an embodiment, an electric motor may comprise motor driver circuitry; a power bus comprising a common node and a plurality of inductive coils. Each inductive coil may comprise a first terminal coupled to the motor driver circuitry and a second terminal coupled to the common node. The motor may further comprise a power supply having a first terminal coupled to the common node and a second terminal coupled to the motor driver circuitry. By coupling terminals of multiple coils to a common node on a power bus, the power supply may provide power (e.g., by maintaining a set voltage at the common node) to the multiple coils at a reduced current level. This may enable use of fewer wires to connect a power supply to multiple motor coils and a reduction in ohmic losses associated with furnishing power to coils of an electric motor.

FIG. 1A schematically illustrates a switched reluctance electrical motor system 10 in one embodiment. The electrical motor comprises a rotor section 12 configured to rotate within two stator sections 14 and 16. The rotor section is configured to have sixteen rotor teeth, which form longitudinal spines extending radially outward and running along the length of the rotor section through both stator sections 14 and 16. Each stator section is configured to have twenty four stator teeth, which form longitudinal spines extending inwardly and also running along the length of each stator section. Each stator tooth is wound with a coil comprising a high number of turns—in this instance there being approximately two hundred. In the embodiment illustrated in FIG. 1A there are no coils on the rotor teeth, as the magnetic fields generated by powering the stator teeth coils cause the motor to rotate by the action of those magnetic fields on the rotor.

The electrical motor system 10 further comprises stator coil driver circuitry 20, which is configured to be controlled by the associated control circuitry 22. A power supply 24 is coupled to both the stator coil driver circuitry and to the stator coils of the motor. As such there can be current flow both between the stator coils and the supply 24 and between the stator coils and the stator coil driver circuitry 20. The significance of this arrangement will become apparent from the description of the further figures.

Figure 1B:
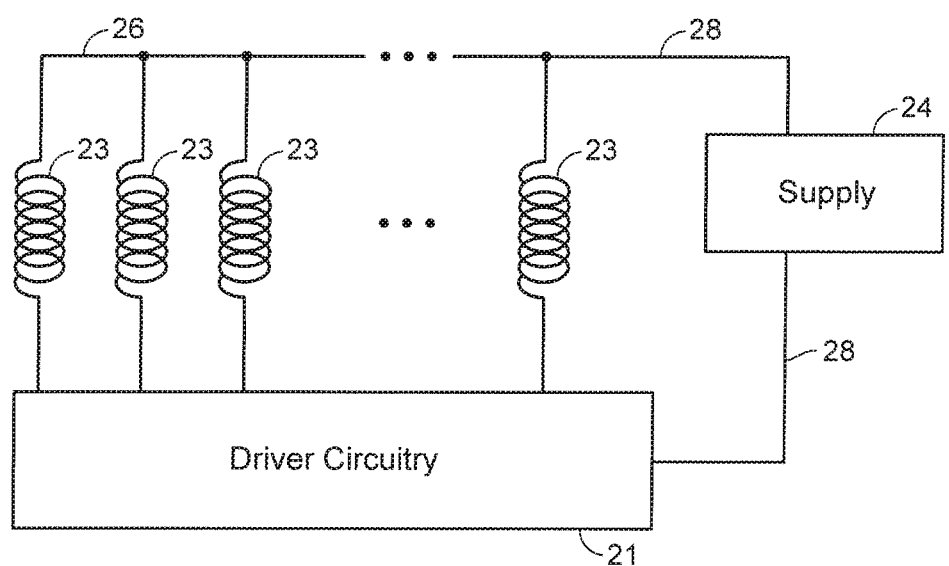
FIG. 1B is a schematic diagram of an electrical motor circuit according to an embodiment.
Figure 8A:
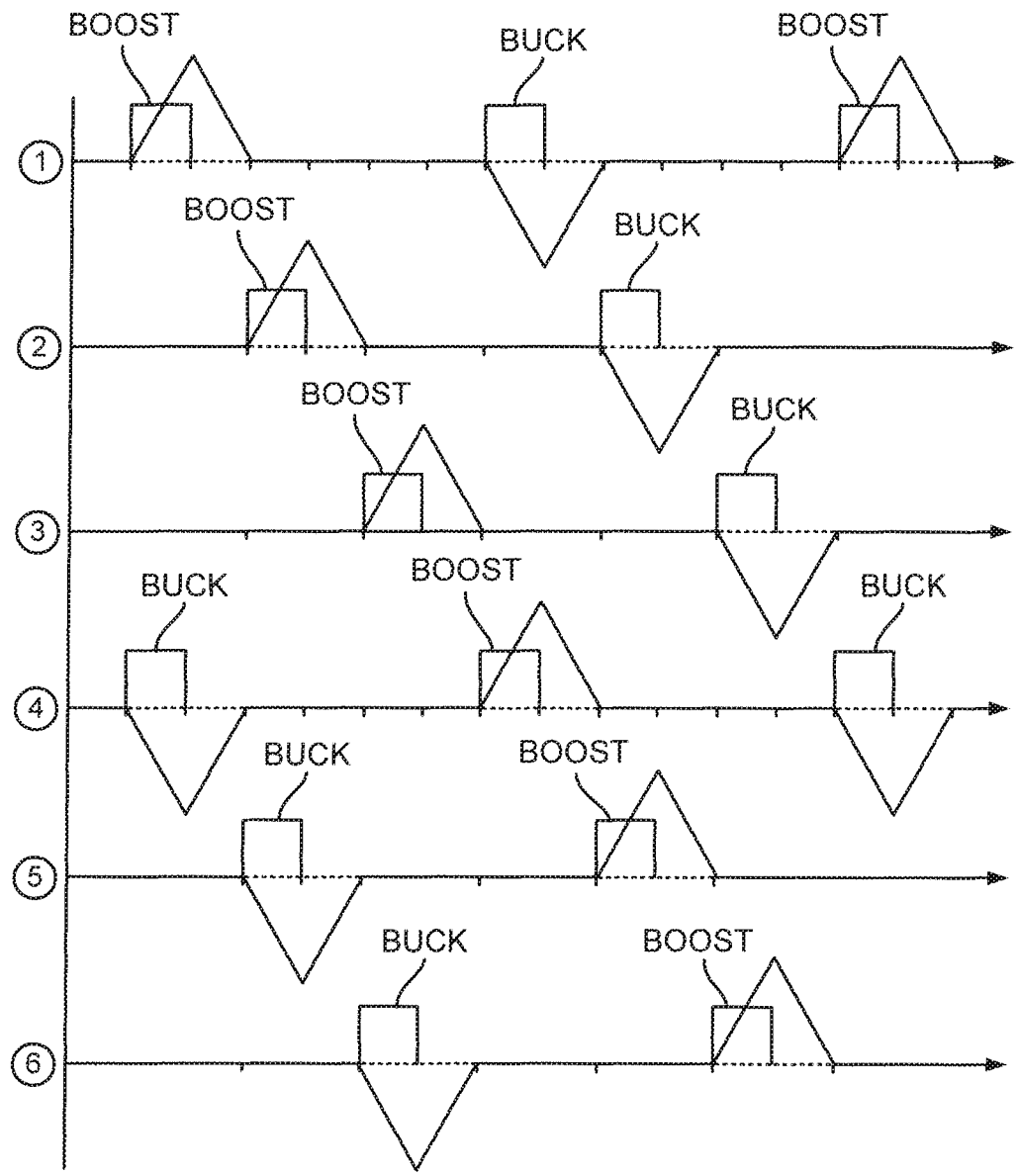
FIG. 8A illustrates a six stage control operation for a group of stator coils in one example embodiment.

FIG. 1B schematically illustrates an implementation in which terminals of electrical motor coils 23 (e.g., stator coils) are coupled to a power bus 26 at a common node to receive power from power supply 24 according to a particular implementation of switched reluctance electrical motor system 10. As discussed below, electrical motor coils 23 may conduct a bi-directional current flowing between driver circuitry 21 and power bus 26 (e.g., as described with reference to FIGS. 3 and 8A). Furthermore, bi-directional currents conducted through different electrical motor coils 23 may not be in-phase. In other words, while a first electrical motor coil 23 may be drawing current from power bus 26, a second electrical motor coils may be supplying or returning current to power bus 26. As illustrated in FIG. 8A, for example, currents through stator coils 1 and 4 are not in phase. For example, a direction of current flowing while stator coil 1 is opposite a direction of current flowing in stator coil 4. Accordingly, in an embodiment, coupling terminals of stator coil 1 and stator coil 4 to a common node at power bus 26 may substantially enable an offset of at least a portion of current flowing into and out of the common node. While power supply 24 may maintain power bus 26 at a particular voltage (e.g., 150 V DC), net current through wires 28 connecting power supply to electrical motor coils and driver circuitry 21 may be very small. This may enable a reduction in ohmic losses associated with providing power to operate switched reluctance electrical motor system 10 as well as a use of fewer wires and/or less expensive wiring for wires 28 for connecting power supply 24.

Figure 2:
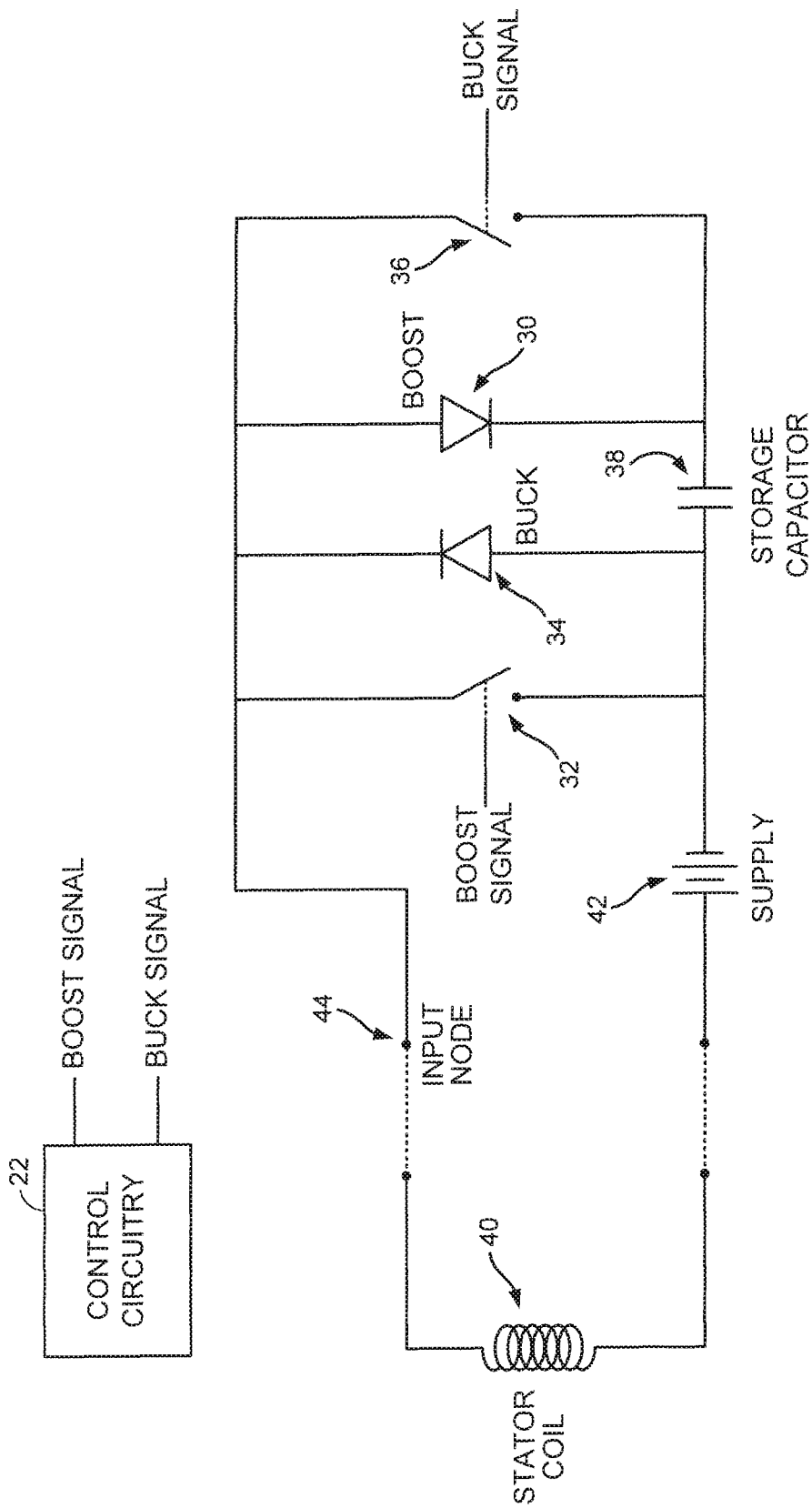
FIG. 2 schematically illustrates a coil driver circuit in one example embodiment.

FIG. 2 schematically illustrates particular principle components of stator coil driver circuitry associated with a single stator coil according to an embodiment. In essence circuitry shown in FIG. 2 may comprise a combination of switched inductance boost voltage converter circuitry and switched inductance buck voltage converter circuitry. Switched inductance boost voltage converter circuitry comprises boost diode 30 and boost switch 32, and switched inductance buck voltage converter circuitry comprises buck diode 34 and buck switch 36. Switched inductance boost voltage converter circuitry and the switched inductance boost voltage converter circuitry share storage capacitor 38. Each is also connected, via the input node 44, to the stator coil 40 which is driven by this circuit and the supply 42. Control signals for the boost switch 32 and the buck switch 36, namely the boost signal and the buck signal respectively, may be generated by the control circuitry (which here is represented by the same control circuitry 22 as shown in FIG. 1A).

In operation the boost and buck signals of the example embodiment of FIG. 2 are asserted in mutual exclusion by the control circuitry 22 to enable stator coil 40 to be powered, and moreover to be driven bi-directionally, wherein current is first caused to flow one way through the stator coil (during "boost" operation) and then to flow the other way through the stator coil (during "buck" operation). Asserting the boost signal to enable the boost switch 32 to close (conduct) enables the supply voltage provided by the supply 42 to be applied to the stator coil 40. The boost signal is asserted for a suitable period until the current flow in the stator coil is generating a sufficient magnetic field for operation of the motor. When the boost signal is switched off, opening the boost switch 32, current may continue to flow (via the boost diode 30) as energy is dissipated from the coil. This energy dissipated from the stator coil 40 may be collected by charging the storage capacitor 38. This quickly boosts the storage capacitor to a static voltage which shuts down the current in the coil.

This "boosted voltage" stored in the storage capacitor 38 may then available for energizing the stator coil 40 in the opposite direction. When this is required the buck signal is asserted to cause the buck switch 36 to close (conduct) and the previously boosted voltage can be applied (via buck diode 34) to the stator coil 40 in the opposite direction to that of the boost phase.

Figure 3:
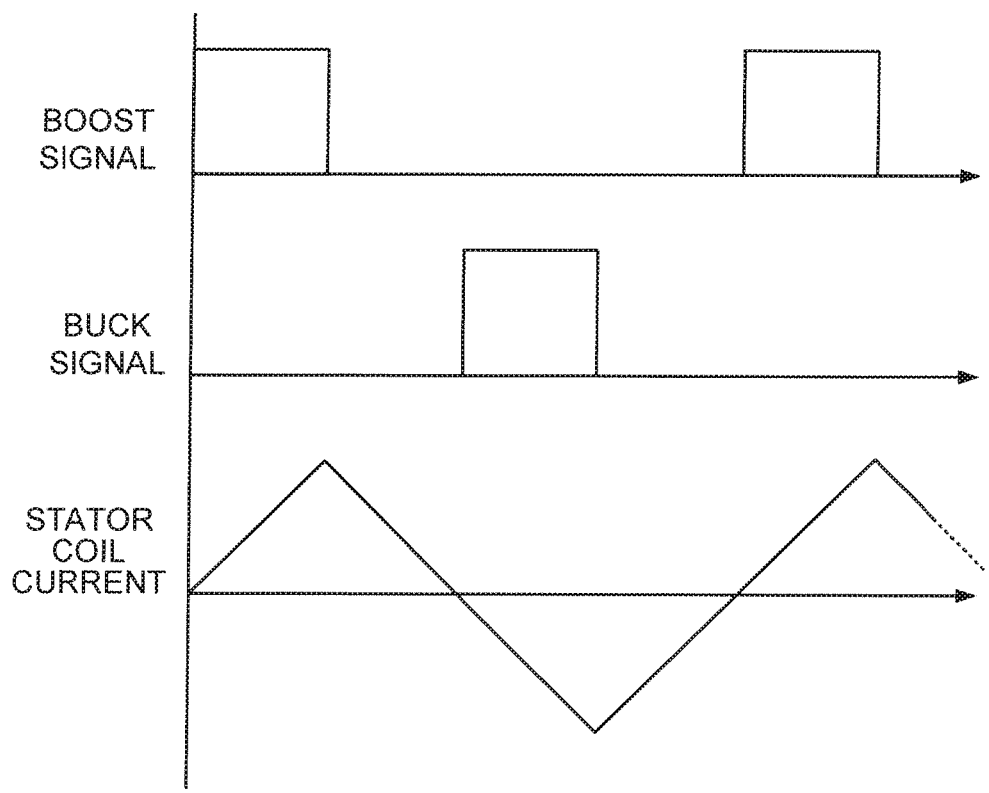
FIG. 3 shows the use of a boost signal and a buck signal in the circuit of FIG. 2 to cause variation in a stator coil current according to an embodiment.

FIG. 3 illustrates the cyclical operation of the circuit shown in FIG. 2, in which the stator coil current is first driven in one (e.g. positive) direction by the assertion of the boost signal, whereafter the stator coil current is driven in the other (e.g. negative) direction by the assertion of the buck signal. Note that the assertion of the buck signal does not take place until the stator coil current has fallen to zero. This means that in the driver circuit voltages are switched when currents are low and currents are switched when voltages are low, making the power dissipation in the switching devices quite small. As discussed in more detail with reference to the embodiment shown in FIGS. 5A, 5B and 6 this means that relatively lightweight switches (e.g. MOSFETs, instead of more expensive IGBTs) may be used as the switches in the circuit.

Figure 4:
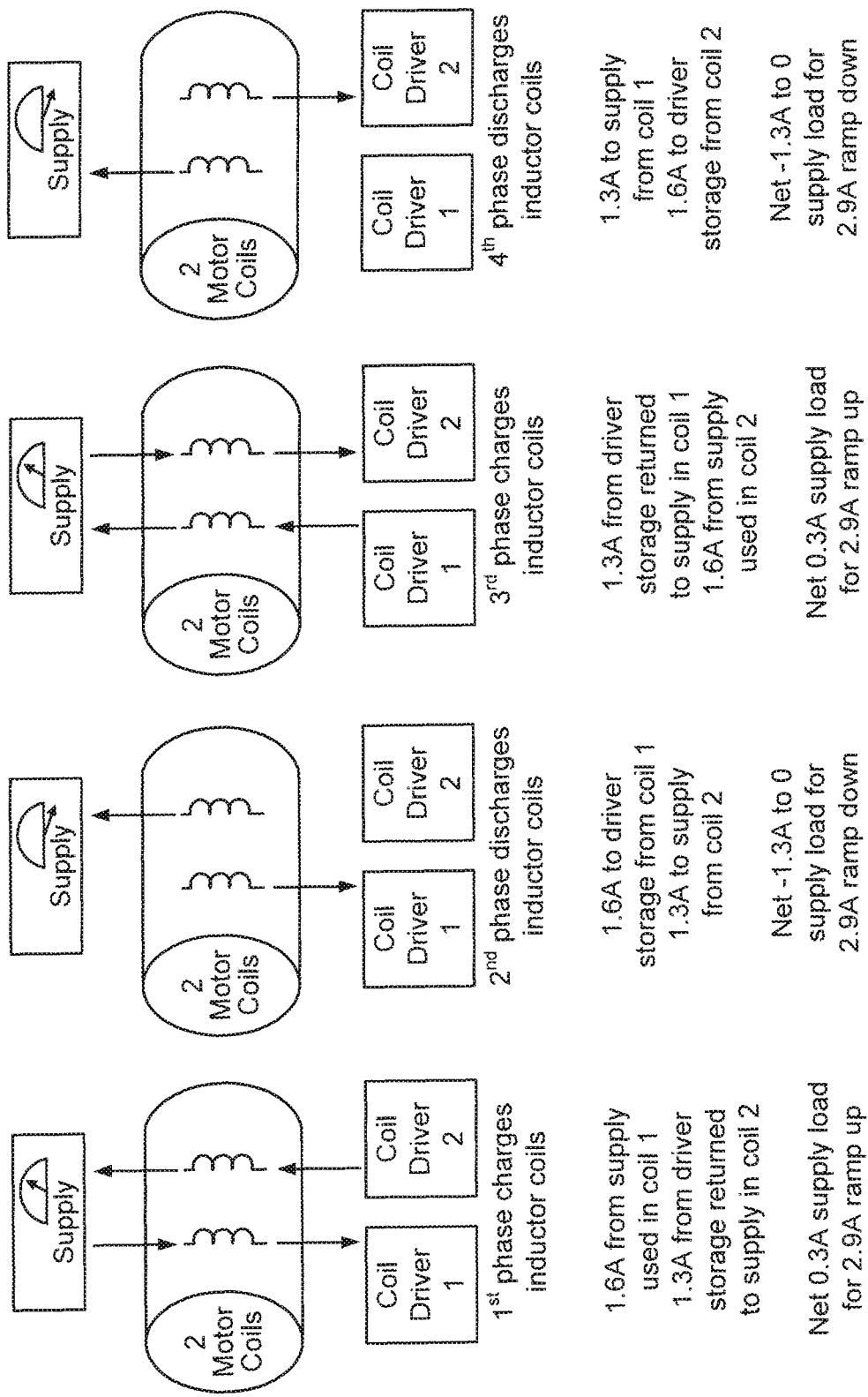
FIG. 4 shows the four phase operation of two coil driver circuits and accompanying current flows in one example embodiment.

A particular advantage of the present techniques with respect to driving electrical motor stator coils can be seen from FIG. 4, which illustrates a four phase process by which two stator coils are driven in one embodiment. Two stator coils are each coupled to a shared (DC) power supply and to their own respective coil driver circuits.

In the first phase both motor coils are charged, but in opposite directions. The first motor coil is charged with current of a first polarity from the shared supply and the second motor coil is charged with current of a second (opposite) polarity from the storage capacitor of the second driver circuit. In the example given in the figure, 1.6 A from the supply is provided to the first coil, whilst 1.3 A deriving from the storage capacitor of the second driver circuit is returned to the supply via the second coil. As a result for a net 0.3 A supply load a sum coil ramp up corresponding to 2.9 A is achieved.

In the second phase both motor coils are discharged, again in opposite directions. The first motor coil is discharged into the storage capacitor of the first driver circuit and the second electrical motor coil is discharged to the shared supply. In the example given in the figure, 1.6 A is passed from the first coil to the storage capacitor of the first driver circuit, whilst 1.3 A is returned to the supply deriving from the second coil. As a result for a net supply load falling from −1.3 A to zero a sum coil ramp down of 2.9 A is achieved.

In the third phase both motor coils are charged again, but in the opposite direction to in the first phase. The first motor coil is charged with current of the second polarity from the storage capacitor of the first driver circuit and the second motor coil is charged with current of the first polarity from the shared supply. In the example given in the figure, 1.3 A deriving from the storage capacitor of the first driver circuit is returned to the supply via the first coil, whilst 1.6 A from the supply is provided to the second coil. As a result for a net 0.3 A supply load a sum coil ramp up corresponding to 2.9 A is achieved.

Finally in the fourth phase both motor coils are again discharged. The first motor coil is discharged to the shared supply and the second electrical motor coil is discharged into the storage capacitor of the second driver circuit. In the example given in the figure, 1.3 A is returned to the supply deriving from the first coil, whilst 1.6 A is passed from the second coil to the storage capacitor of the second driver circuit. As a result for a net supply load falling from −1.3 A to zero a sum coil ramp down of 2.9 A is achieved.

Figure 5A:
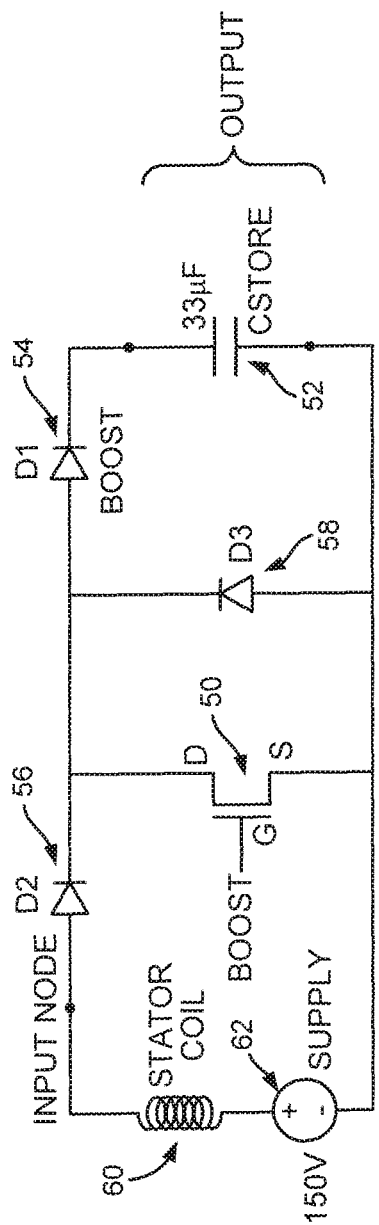
FIG. 5A schematically illustrates switched inductance boost voltage converter circuitry forming part of a driver circuit in one example embodiment.
Figure 5B:
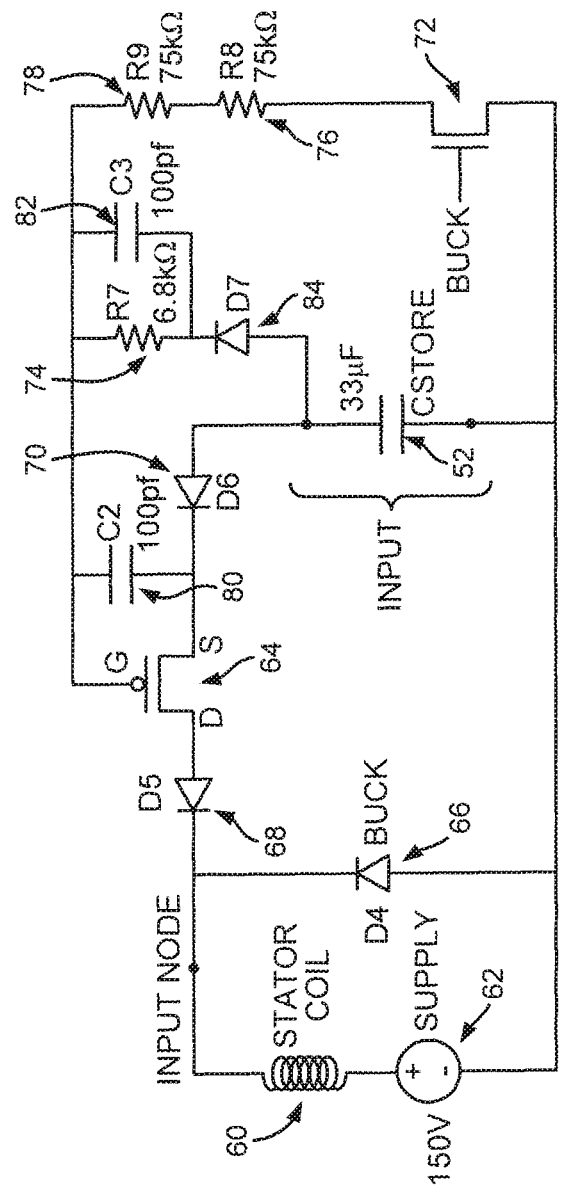
FIG. 5B schematically illustrates switched inductance buck voltage converter circuit forming part of a driver circuit in one example embodiment.
Figure 6:
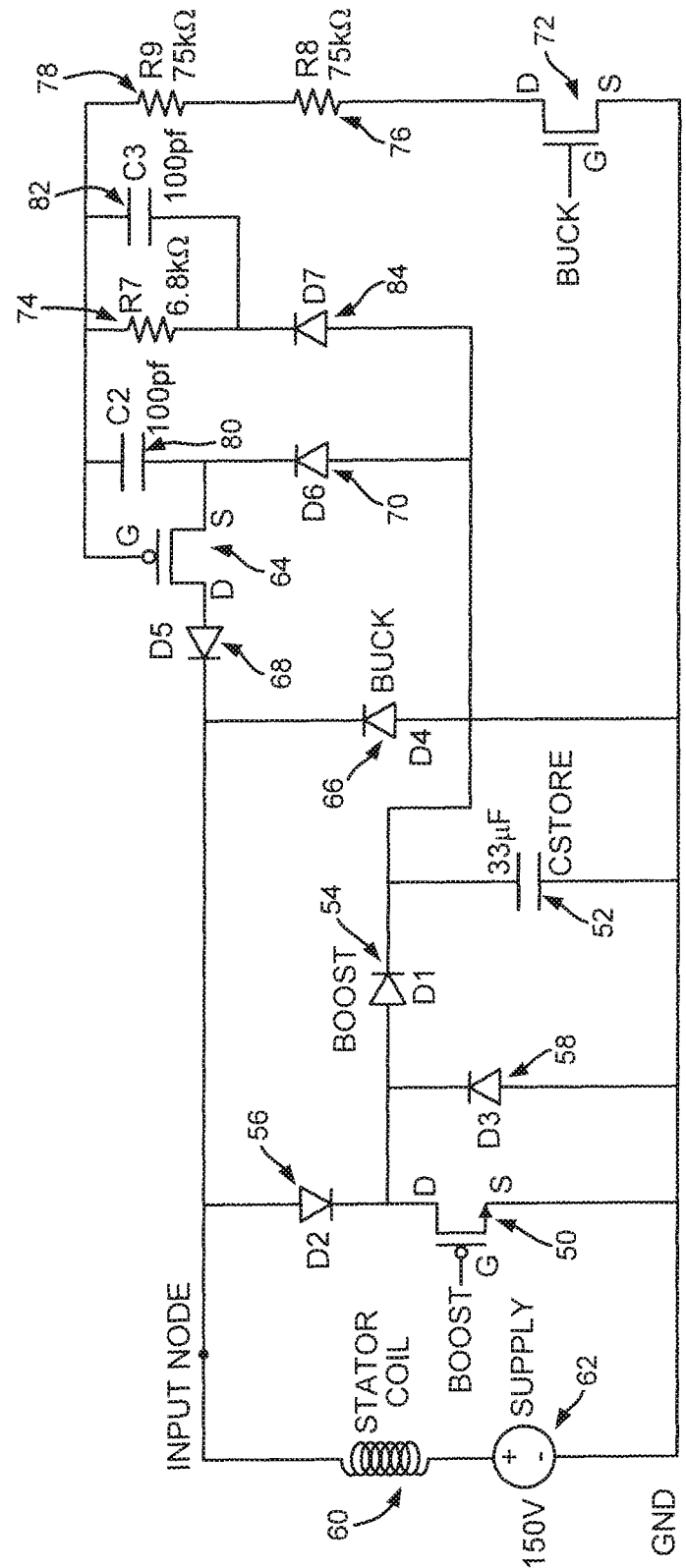
FIG. 6 schematically illustrates a driver circuit in one example embodiment.

More detail of the configuration of a driver circuit in one embodiment is now given with reference to FIGS. 5A, 5B and 6. The switched inductance boost voltage converter circuitry is represented separately in FIG. 5A, whilst the switched inductance buck voltage converter circuitry is represented separately in FIG. 5B, and the combined driver circuit having both switched inductance boost voltage converter circuitry and switched inductance buck voltage converter circuitry is shown in FIG. 6.

In the switched inductance boost voltage converter circuitry of FIG. 5A the boost switch is provided by the NMOS 50, whilst the storage capacitor (CSTORE) is provided by the 33 μF capacitor 52. Note that in addition to the boost diode (D1) 54, two further diodes D2 56 and D3 58 are also provided in this embodiment. The boost voltage converter circuitry is coupled to the stator coil 60 and the 150V DC supply 62.

With regard to the switched inductance buck voltage converter circuitry of FIG. 5B, it is important to note that the storage capacitor (CSTORE) is the same 33 μF capacitor 52 as shown in FIG. 5A. As labelled in FIGS. 5A and 5B, the voltage developed across the capacitor 52 can be viewed as an output of the switched inductance boost voltage converter circuitry of FIG. 5A and as an input of the switched inductance buck voltage converter circuitry of FIG. 5B. Also the buck voltage converter circuitry is coupled to the same stator coil 60 and the same 150V DC supply 62. In the embodiment shown in FIG. 5B the buck switch is provided by the PMOS 64. In addition to the buck diode 66 (D4), two further diodes 68 and 70 (D5 and D6) are also provided in this embodiment. Finally the switched inductance buck voltage converter circuitry of FIG. 5B also comprises reference circuitry coupled to the gate of the buck switch (PMOS 64). This reference circuitry is composed of NMOS 72, resistors 74, 76 and 78 (R7, R8 and R9), capacitors 80 and 82 (C2 and C3) and diode 84 (D7).

More detail of the configuration of the full driver circuit in this embodiment, showing its switched inductance boost voltage converter circuitry and its switched inductance buck voltage converter circuitry in their combined configuration is now given with reference to FIG. 6. The components of the driver circuit of FIG. 6 have the same reference numerals as the components shown in FIGS. 5A and 5B, since these latter separate representations are only shown separately to emphasize the respective part to which each component of the full driver circuit belongs.

The various additional diodes (e.g., in addition to the boost and buck diodes shown in FIG. 2) that are provided in this embodiment may serve a number of purposes, but overall a particular role that they play is to enable switching devices (e.g., boost switch 50 and buck switch 64) to be provided by very inexpensive MOSFET devices (instead of much more expensive IGBT devices, say), despite the size of motor coil and the supply voltage required for the motor (e.g., a 35 mH coil and a 150V DC supply). A large EMF and rapid voltage changes associated with operating a motor with this kind of configuration has the potential to cause damaging voltages and gate-step (turning them on when supposed to be off). As such, these diodes may be used throughout the circuit to provide power blocking that protects the switches. Diodes may also serve to separate the switched inductance boost voltage converter circuitry from the switched inductance buck voltage converter circuitry, such that the operation of one does not risk damage to the components of the other. For example, the combination of the diodes 68 and 70 (D5 and D6) placed either side of PMOS 64 in the buck voltage converter circuitry may prevent the power of the current flow discharging from the coil from turning this PMOS on and off during the "boost" mode of operation of the driver circuit (and thus adversely affecting correct operation of that boost mode and risking damage to this other components of the buck voltage converter circuitry).

Note that the transistor 64 is provided as a PMOS (as opposed to a cheaper NMOS) device, since when in the "buck" mode of operation and bucking through the inductance (coil) to the supply, the inductor (stator coil 60) pulls current through the buck diode 66, dropping the switch there to one diode drop below ground. This works when using a PMOS for transistor 64, since it just adds a little more drop on its drain. An NMOS device could in principle be used, but because of the above-mentioned pull down to below ground (which would be on the source of the NMOS device), additional circuitry would be required to provide its gate voltage at a below-ground level, since otherwise it could not be turned off when the inductor (stator coil 60) is discharging.

Additionally, the diodes in the circuit provide a rectifying function to rectify oscillations (ringing) that otherwise would strongly occur when driving a large capacitor from a large inductor.

The capacitors 80 and 82 (C2 and C3) may be provided to suppress noise in the circuitry that could otherwise affect the stability of the switching of the gate of the buck switch (PMOS 64), the gate of this transistor being in particular susceptible to such noise by virtue of its connection to the storage capacitor 52 (albeit via the diodes 70 and 84 (D6 and D7). The capacitors 80 and 82 also form part of the reference circuitry, which notably further comprises the resistors 74, 76 and 78 (R7, R8 and R9) and the NMOS transistor 72. The provision of this reference circuitry enables the buck signal (BUCK) to be referenced to ground (GND) and the gate signal of the buck switch 64 to be referenced to the voltage present on the upper side (as illustrated in FIG. 6) of the storage capacitor 52. Hence, switching of the digital (low voltage) BUCK signal is able to correctly control the switching of the buck switch 64 by virtue of setting a correct source-drain threshold voltage (with respect to the voltage seen on the storage capacitor). Note that the parallel configuration of the diodes 70 and 84 (D6 and D7), the capacitors 80 and 82 (C2 and C3) and the resistors 74 and 76/78 (R7 and R8/R9) enable the circuitry to perform consistently across a range of voltage and temperature variation, due to the equivalent response that each these components in their respective pairs will have to that temperature and voltage variation. Note that logically the resistors 76 and 78 (R8 and R9) can be considered to form a single resistor, though are provided as two distinct components in this example embodiment for reasons of lower cost and size, as well as improved power dissipation. The provision of the diodes 70 and 84 (D6 and D7) also reduces the gate drop needed to be provided by the remainder of the reference circuitry, further reducing the cost of the resistive components that need to be explicitly provided (since they have lower power requirements) and allow a range of voltages to more easily be handled.

Figure 7:
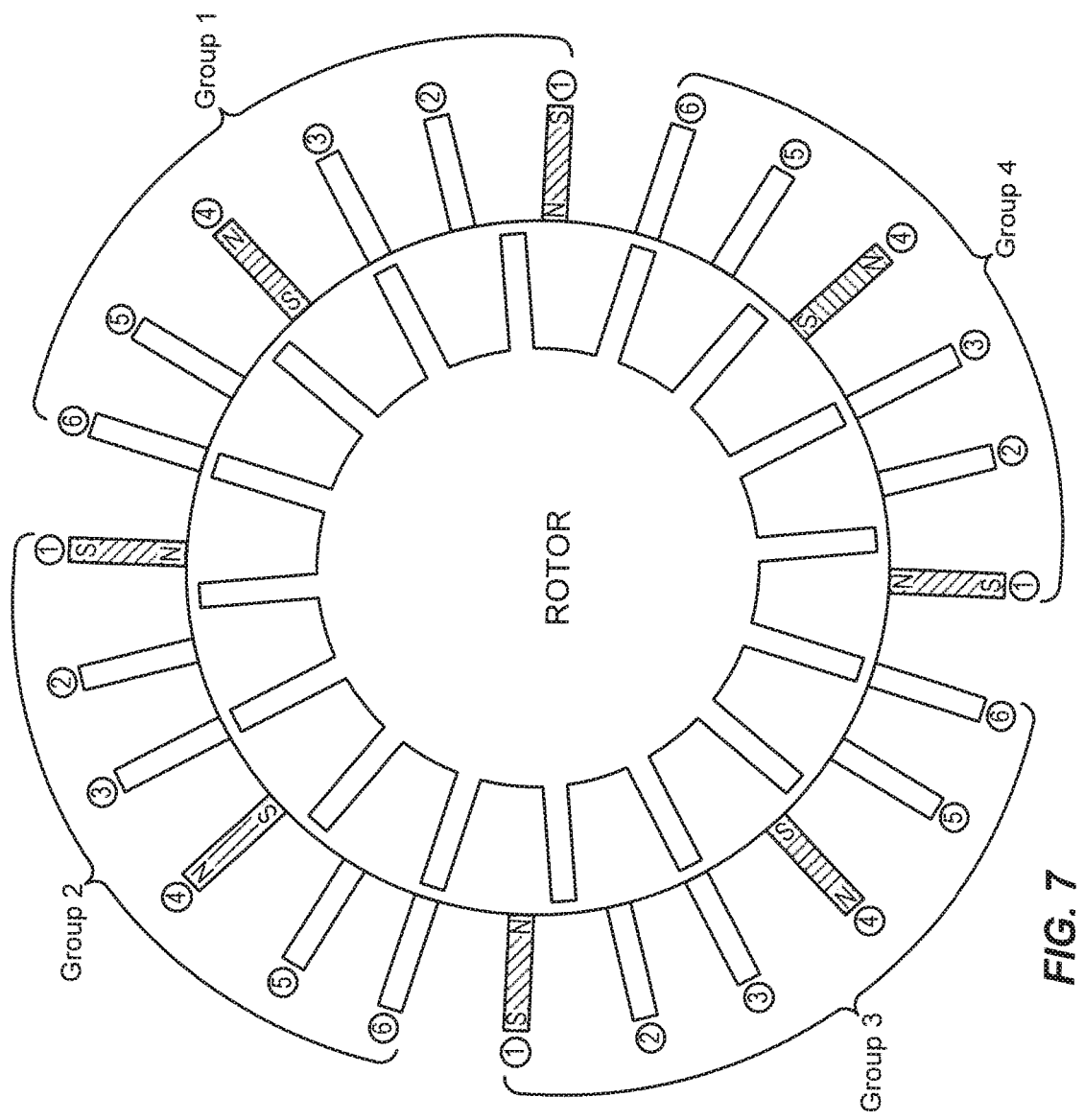
FIG. 7 shows an end view of a switched reluctance electrical motor in one example embodiment.

FIG. 7 schematically illustrates a radial view of the rotor section and the teeth of one stator section in one example embodiment. In this embodiment control over the coils (not illustrated) of the stator section is arranged such that groups of 6 stator teeth have been put together and the cyclical control sequence asserted over each group runs through six stages, corresponding to the six stator teeth in that group.

Figure 12A:
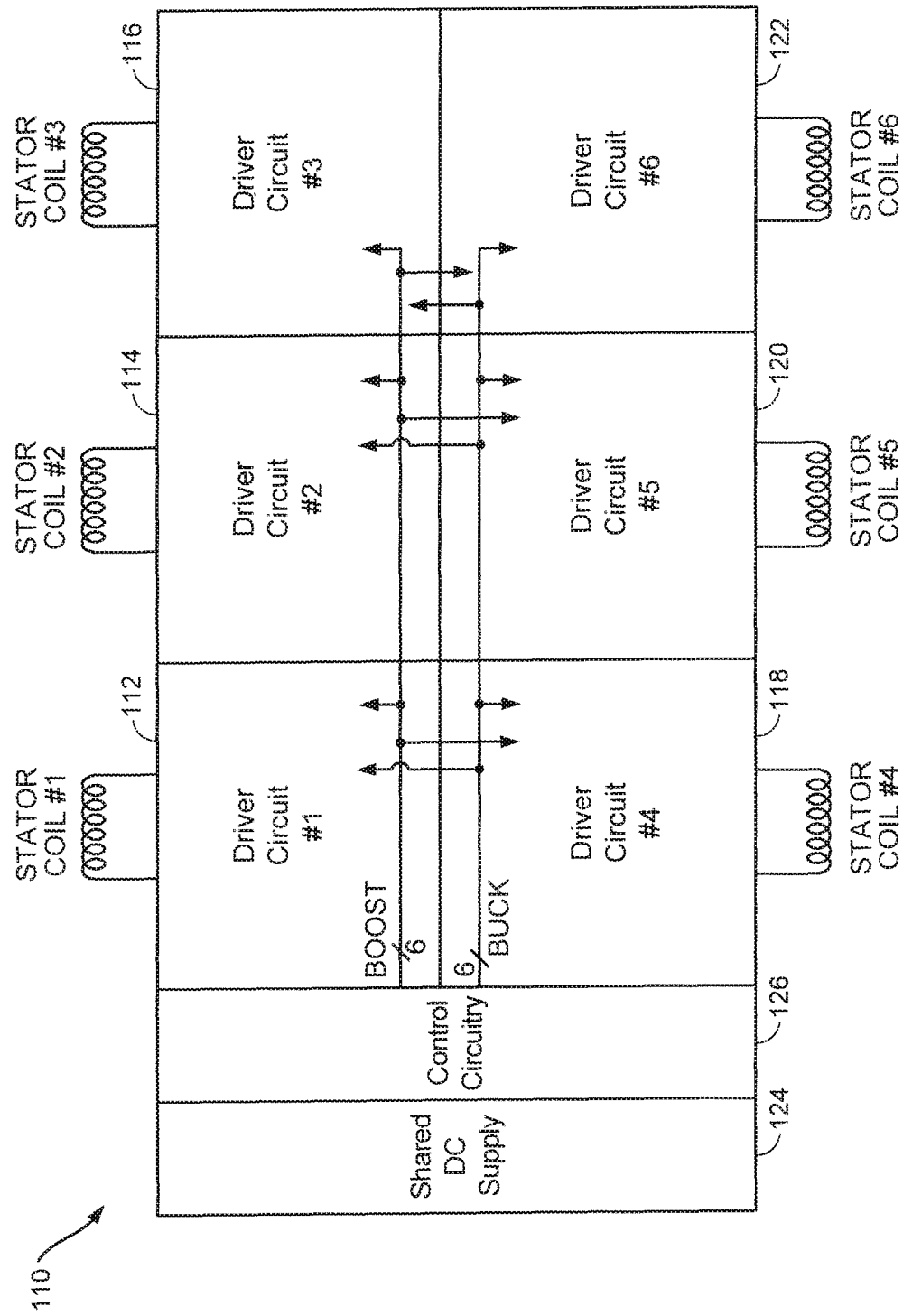
FIG. 12A is a schematic diagram of a driver board comprising six electrical motor coil driver circuits in one example embodiment.
Figure 12B:
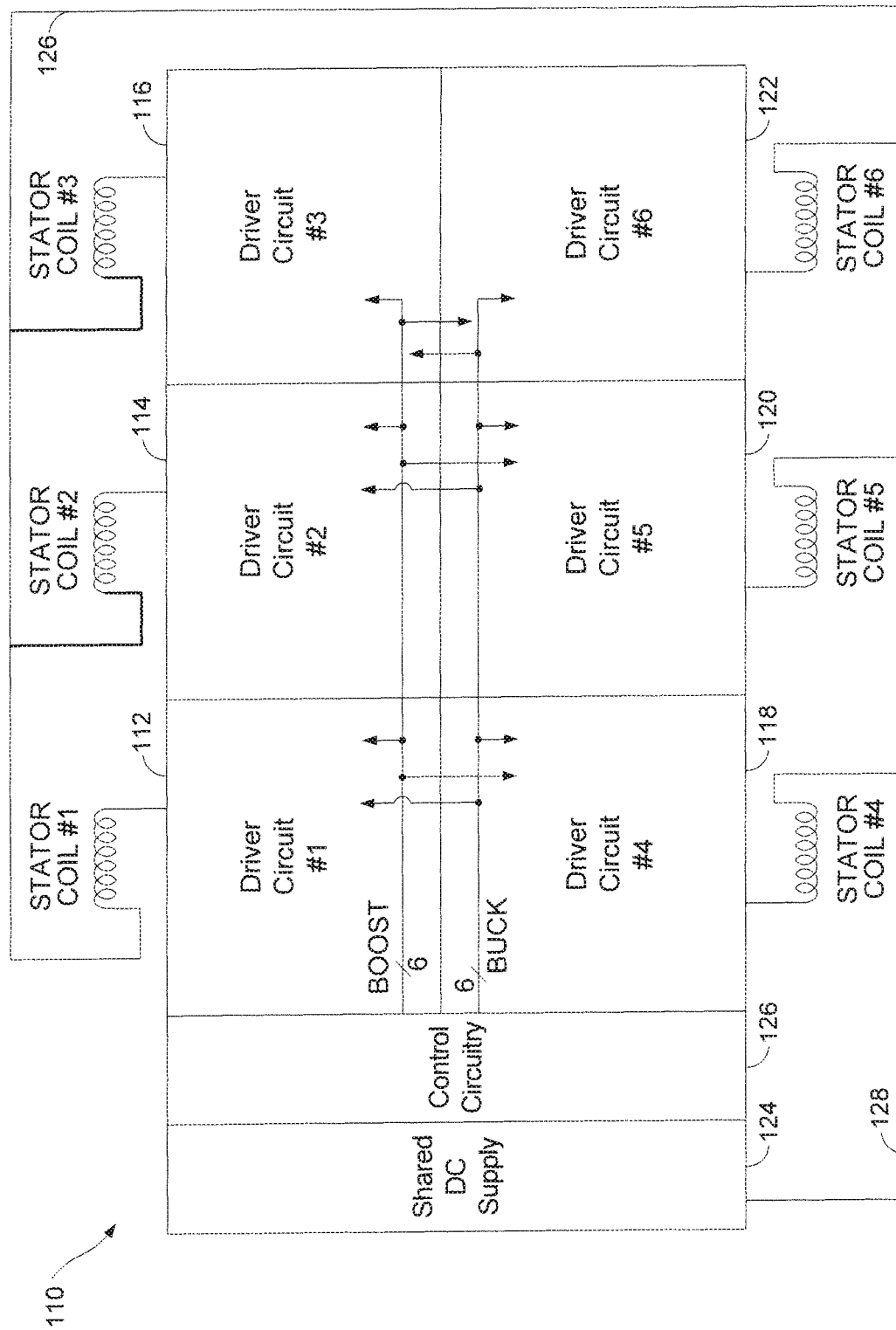
FIG. 12B is a schematic diagram of a driver board comprising six electrical motor coil driver circuits according to an alternative embodiment.

A further feature of this embodiment, to be discussed in more detail below with reference to FIGS. 12A and 12B, is that the driver circuits associated with each stator coil in a group are provided on one board which shares control circuitry and a single DC supply, so that the above-mentioned benefits of one driver circuit operating in "buck mode", whilst another driver circuit which shares the same supply is operating in "boost mode" can result. FIG. 7 further illustrates a snapshot of one stage of the six stage cycle in which a first stator coil in each group (labelled 1 in the figure) is currently being powered in a first direction (boost mode) in this embodiment, in which the resulting magnetic field induced in the stator tooth is oriented north (N) radially inwards and south (S) radially outwards, whilst the fourth stator coil in each group is simultaneously being oppositely powered (buck mode) in this embodiment, such that the magnetic field induced in the stator teeth is orientated south (S) radially inwards and north (N) radially outwards. Driving the stator coils of this electrical motor continues in this paired opposing induced magnetism fashion, wherein at the next stage stator teeth 2 and 5 are driven (oppositely with respect to one another), followed by stator teeth 3 and 6, followed by stator teeth 1 and 4 (in the opposite magnetic configuration to the first phase) and so on.

Still referring to FIG. 7, note that the configuration of the rotor and stator teeth (in particular the 2:3 ratio of their number) results in an arrangement in which when half of the rotor teeth are directly aligned with corresponding stator teeth, the other half of the rotor teeth are unaligned with the stator teeth (being aligned with the center of the gap between two stator teeth in this embodiment). For an aligned pair of rotor/stator teeth this means that there is only a relatively small air gap (e.g. less than 0.5 mm) between the rotor tooth and the stator tooth, which corresponds to a radial magnetic field without tangential magnetic field and hence no output power (zero torque) from the motor. Conversely the non-alignment of the other stator teeth of the set of six stator teeth with corresponding rotor teeth can thus provide a high reluctance and high torque configuration (due to the larger air gap, e.g. more than 1.0 mm) between the non-aligned stator/rotor teeth). Whilst in known switched reluctance electric motors partial overlap between the rotor and stator teeth may be required in order to keep the motor in a configuration where reluctance is low for an acceptable efficiency, but torque can still be achieved—although at a level below the maximum possible, the present electrical motor system achieves an improved trade-off between torque and efficiency by providing a configuration in which higher torque can be generated (by the non-aligned stator/rotor teeth), but also in which energy that is expended in generating a magnetic field which doesn't get used gets recycled, thus improving the efficiency.

FIG. 8A schematically illustrates the relative timing of the boost and buck signals in the driver circuits which provide the above-described control over the set of six stator teeth in each group. The above mentioned pairing over the control over stator coils 1/4, 2/5 and 3/6 can be seen, in which the stator coil of each pair is always driven by a driver circuit in opposite mode (boost/buck) and the resulting current flow (triangular wave forms in the figure) is always of opposite plurality. Note that the start of the assertion of the boost and buck signals only begins when the current in the respective circuit is zero (or at least negligible) to ensure that the components of the respective driver circuits are not damaged by any residual opposing current flow. The sequence of control signals shown in FIG. 8A is applied to each of the four groups of stator coils shown in FIG. 7 when the electrical motor is configured to be in a full power configuration, however it is also possible for the electrical motor to operate in a lower power configuration when at least one of the groups of stator coils is not powered. This may be achieved by varying the boost and buck control signals asserted, which may in turn be achieved by switching off one or more driver circuits or one or more driver boards as appropriate. Additionally, it should be noted that the speed at which the motor operates is thus determined by the timing sequence of boost and buck signals applied (such as in FIG. 8A) and not on the particular power level at which the motor is operating. The power level may be determined by the size of the current pulses which result from the chosen boost and buck signal durations. Hence, for example, for approximately similar power levels, the motor may be operated at two significantly different speeds (e.g. 500 rpm and 1000 rpm). This independence of the rotational speed from the operational power level adds significant flexibility to the user's choice of how to operate the motor, dictating the rotational speed by means of the timing sequence and the overall operational power level by the choice of which groups of stator coils to power. Moreover the fact that the user has such direct and independent control over the rotational speed of the motor means that in many circumstances the transmission or gearing provided in association with a traditional electric motor can be dispensed with.

Figure 8B:
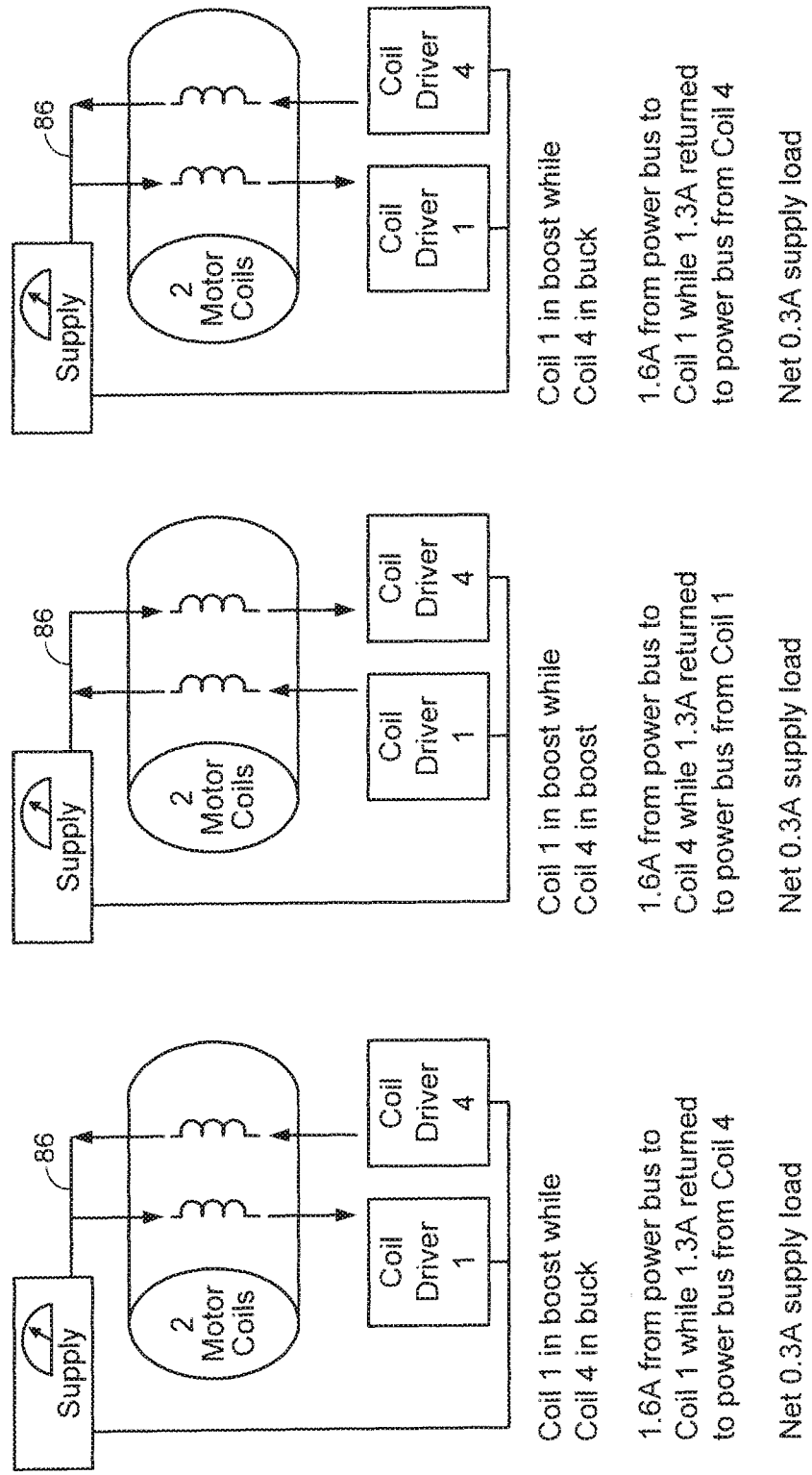
FIG. 8B illustrates net current for a power supply load for operation of two stator coils according to an embodiment.

FIG. 8B shows operation of stator coils 1 and 4 according to an embodiment of FIG. 8A. As may be observed from FIG. 8A, coil 1 is in a boost state while coil 4 is in a buck mode operation, and coil 1 is in a buck mode operation while coil 4 is in a boost mode operation. As shown, terminals of coils 1 and 4 are coupled to a common node at power bus 86, which receives a load current from a power supply. While coil 1 is drawing 1.6 A current from power bus 86 during a boost operation, coil 4 may return 1.3 A current to power bus 86 such that a net current of 0.3 A is drawn from the power supply. Likewise, while coil 4 is drawing 1.6 A current from power bus 86 during a boost mode operation, coil 1 may return 1.3 A current to power bus 86 in a buck mode operation such that a net current of 0.3 A is drawn from the power supply. As may be observed from FIG. 8A, similar behavior may occur with coil 2 in combination with coil 5, and coil 3 with coil 6 in that current drawn in a boost mode operation of a first stator coil is largely offset by current supplied by a second coil in a buck mode operation.

Figure 9:
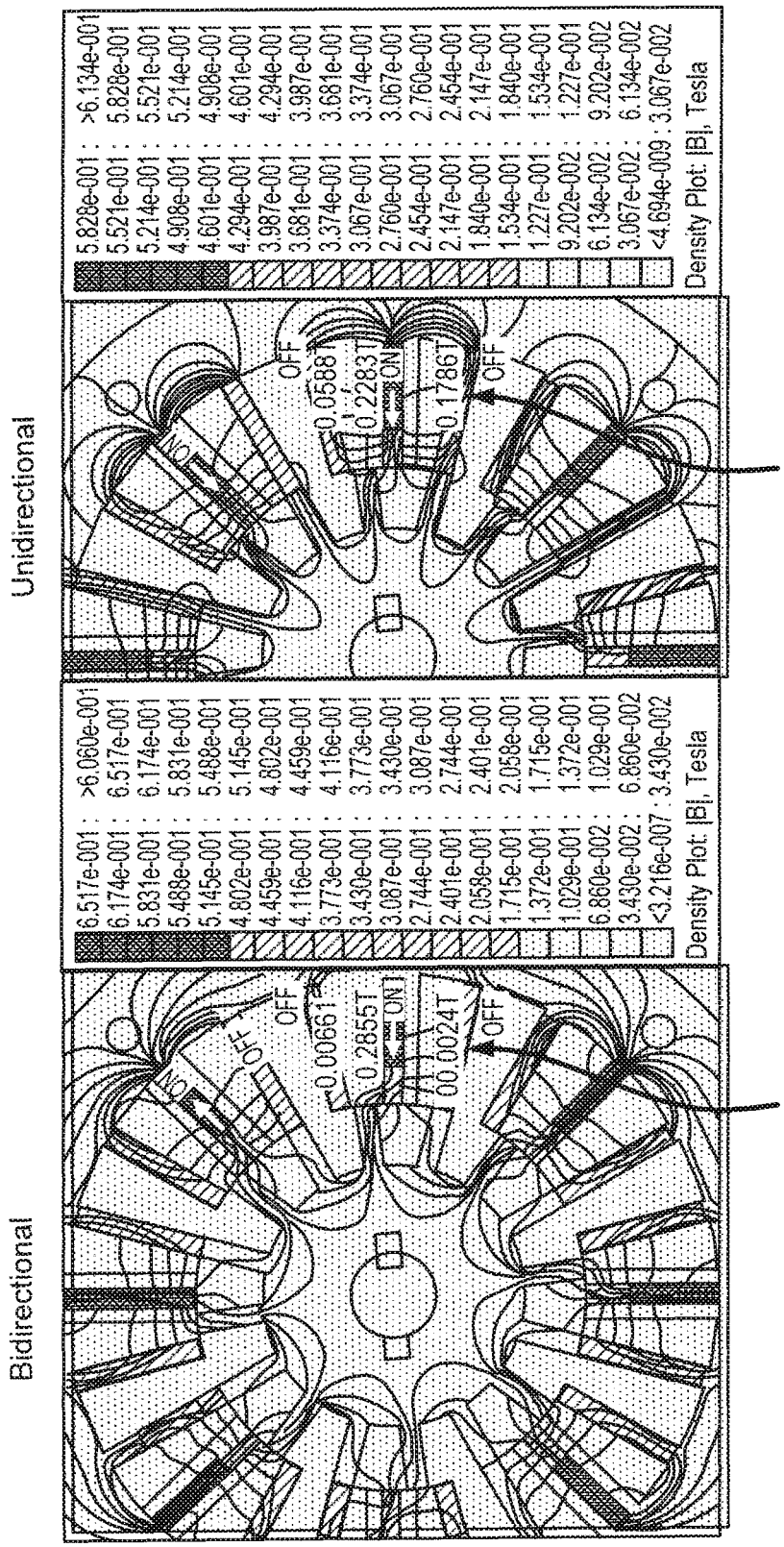
FIG. 9 shows a simulation of the magnetic field density for a switched reluctance motor powered by a bidirectional coil driver circuit of one example embodiment compared to configuration which only provides unidirectional current.

FIG. 9 shows a simulation of the magnetic fields which develop in one operational state of an example electrical motor when viewed in the same radial presentation as that of FIG. 7. This (shown on the left hand side) is labelled "bidirectional" and corresponds to driver circuits according to the present techniques being used to simultaneously drive pairs of stator coils in a group in opposite directions. For comparison a second simulation (shown on the right hand side) is labelled "unidirectional" and corresponds to a configuration in which instead pairs of stator coils in a group are simultaneously driven in the same direction. The magnetic field notations (in Tesla) are what occur in the air gaps between the stator teeth. When measured in the air gap, it can be seen that (for the bidirectional case by comparison with the unidirectional case) the resulting ON field is about 25% greater, the top OFF field is about 9 times smaller and the bottom OFF field is nearly 750 times smaller. The increased ON field increases torque and the decreased OFF fields reduce drag. This is due to the fact that the bidirectional configuration creates reinforcing magnetic fields in the electrical motor—and in particular in the rotor section—which further enhance the efficiency of this motor system.

Figures 10A, 10B:
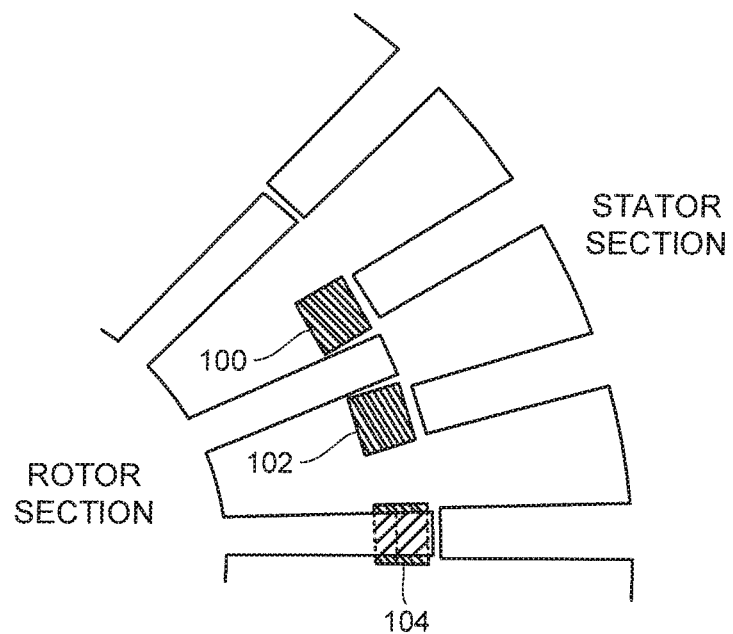
FIG. 10A schematically illustrates the placement of three optical sensors to provide rotational position information for the rotor with respect to the stator in an electrical motor in one example embodiment.
FIG. 10B shows the set of six possible optical sensor outputs for the three optical sensors shown in FIG. 10A.

FIGS. 10A and 10B illustrate the use of optical sensors to provide relative position information for the rotor section with respect to the stator section(s). FIG. 10A shows three optical sensors 100, 102, 104 positioned aligned with three of the stator teeth, and sized and calibrated such that a) when a rotor tooth is aligned with an optical sensor and stator tooth, only one optical sensor registers the presence of a rotor tooth and b) as the rotor rotates with respect to the stator section, at most two of the optical sensors register the presence of rotor teeth. This configuration means that with only three optical sensors (ultimately resulting in three bits of information—possibly after analogue to digital conversion, depending on the type of sensor used) the relative orientation of the rotor to the stator can be determined to within 3.75 degree (e.g., for this particular 16 rotor teeth/24 stator teeth example configuration). Moreover there are no intermediate positions in which no information about the relative rotor-stator position is available and as such whatever position the motor stops in it can always be known which stator coils to activate to get the motor running. FIG. 10B shows the corresponding three optical sensor outputs as the rotor rotates with respect to the stator.

Figure 11:
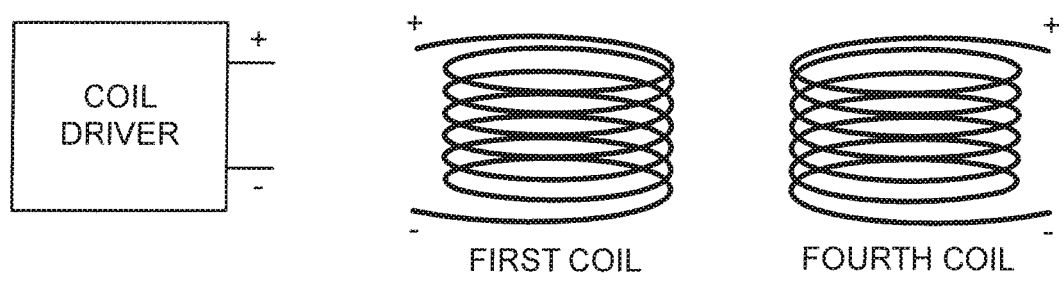
FIG. 11 schematically illustrates an example of how the magnetic field polarity in a motor coil may be inverted in two example embodiments.

In some example configurations the direction of the electrical power through a stator coil—and hence the direction of the resulting magnetic field—may be brought about by a particular configuration of the connections to the coil. FIG. 11 shows one example configuration in which a coil driver circuit can be used to provide the power to both of a pair of stator coils which are active at a time, but activated in opposite directions (in the figure this being the first and fourth coil in a group of six). The winding of the first and the fourth coils has been made in the opposite sense to each other, so that for one polarity of electrical power provided by the coil driver, oppositely oriented magnetic fields in the first and fourth stator teeth results. Windings of stator coils for other pairs of coils (e.g., second coil paired with fifth coil, or third coil paired with sixth coil) may be similarly made in opposite sense to one another.

FIG. 12A schematically illustrates a driver board in one example embodiment. This driver board is provided as a single integrated circuit board on which six driver circuits 112, 114, 116, 118, 120 and 112 (for example configured as shown by FIG. 6), control circuitry 126 and shared DC supply 124 are arranged. The control circuitry provides the boost and buck control signals individually to each of the driver circuits. The provision of the shared DC supply on the same board as the six driver circuits means that the above-described (for example with respect to FIG. 4) majority movement of current within the board (as opposed to on and off the board) is supported.

Figure 13A:
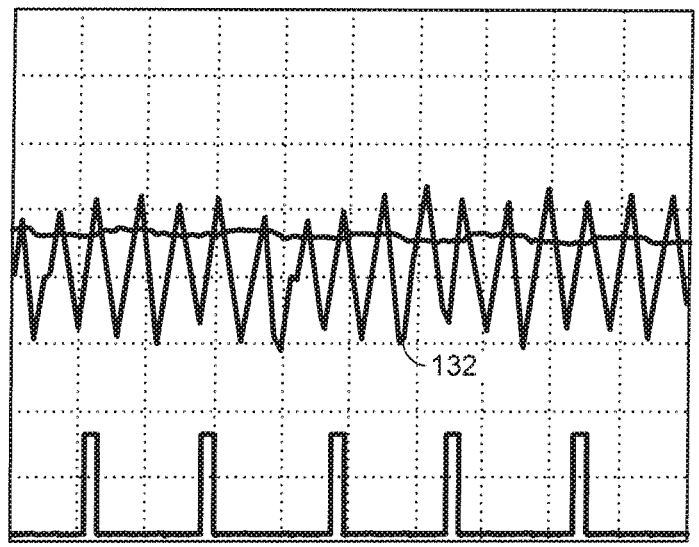
FIGS. 13A and 13B are plots of current between a power supply and motor coils according to alternative embodiments.
Figure 13B:
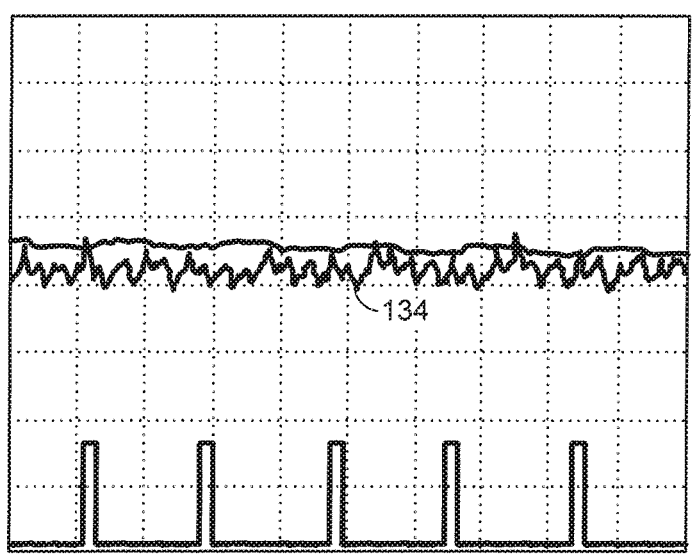

In the particular implementation of FIG. 12A, it may be observed that stator coils 1 through 6 are coupled to receive power from shared DC supply 124 through associated diver circuits. Here, a controlled voltage may be independently maintained between terminals of each of the stator coils 1 through 6. Wiring to individually supply current to stator coils 1 through 6 may be of a gauge to handle peak current supplied to an individual stator coil (e.g., 1.6 A) as discussed above at FIG. 4. As illustrated in the alternative implementation of FIG. 12B, a terminal of each of the stator coils 1 through 6 are connected to a common node at a power bus 126. Here, as illustrated in FIGS. 8A and 8B as discussed above, current from a common node of a power bus supplied to one stator coil in a boost mode operation may be largely offset by current returned to the common node by another stator coil in a buck mode operation. As such, net current supplied from shared DC supply 124 may be very small, thus reducing ohmic losses through wiring supplying current to stator coils from a power supply. In the particular implementation of FIG. 12B, wiring for supplying power to six coils may be reduced from twelve wires (e.g., from the implementation of FIG. 12A with two wires per coil for coupling to respective driver circuits) to eight wires: six wires coupling a first terminal of coils to respective driver circuits and two wires connecting a common node to a power supply. For an example current draw of the implementation of FIG. 12A of 320 mA, the implementation of FIG. 12B may reduce current draw by 180 mA, enabling a reduction in ohmic wiring loss of 33%. FIGS. 13A and 13B are plots illustrating current supplied to stator coils according to particular embodiments. Current plot 132 at FIG. 13A shows current supplied to phases on three coils (e.g., coil 1, 2 and 3 as shown in FIG. 8A). Current plot 134 at FIG. 13B shows current supplied to phases on three coils (e.g., coils 1, 2 and 3 as shown in FIG. 8A) combined (e.g., at a common node of a power bus) with current supplied to phases on phases on three additional coils (e.g., coils 4, 5 and 6 as shown in FIG. 8A). As may be observed, current shown by plot 134 is largely offset by current supplied/returned by phases on the additional three coils. In the particular illustrated embodiment, RMS current shown by plot 132 drops from 1050 mA RMS to 319 mA for the current shown by plot 134.

Plot 134 shows net current supplied to phases of six coils. Other embodiments may be directed to combining currents supplied to phases of 12 or 24 coils (e.g., from a common node on a power bus) to further reduce variations in current shown in plot 134. In addition, the particular implementation of FIG. 12B may be further modified by coupling a capacitor (not shown) between power bus 126 and a reference node at driver circuits to smooth variations in current shown in plot 134.

Figure 14:
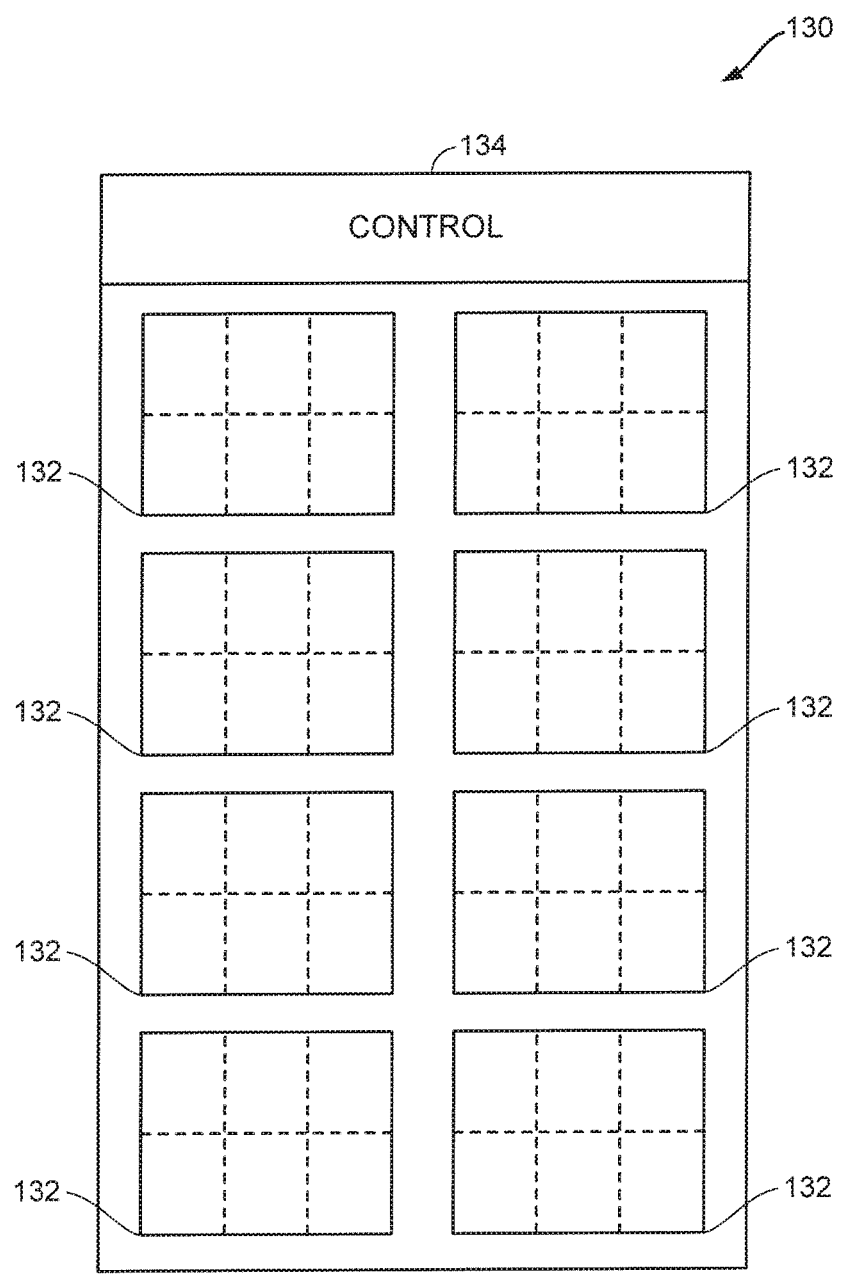
FIG. 14 schematically illustrates a switched reluctance electrical motor driver apparatus comprising eight driver boards as shown in the alternative embodiments of FIGS. 12A and 12B.

FIG. 14 schematically illustrates a complete switched reluctance electrical motor driver apparatus 130 in one example embodiment which comprises eight driver boards 132 (for example configured as shown by FIGS. 12A and 12B) and is hence configured to control 48 individual stator teeth (as are present in the example motor system shown in FIG. 1A). An overall control unit 134 also forms part of the apparatus 130 and dictates the high-level operation of the eight driver boards 132, for example causing individual driver boards to be temporarily switched off when the electrical motor should operate in a lower power mode and when each individual driver board is coupled to a set of stator coils (for example a quadrant in each stator section) which can be switched off to effect this low power mode. It is important to appreciate however that the combination of driver circuit control provided by the overall control 134 and the board controls 126 are such that firstly any individual driver circuit can be switched on or off regardless of the operation of the other driver circuits and secondly the control over each stator coil provided by each driver circuit is fully independent of the control over any other stator coil provided by any other driver circuit. As such therefore, the electrical motor driver apparatus 130 thus provides individual control over up to 48 driver circuits and hence stator coils, although in the light of the above discussion about groups of stator coils and pairs of driver circuits it may be chosen to closely link the operation of some driver circuits due to the benefits which result, and in such a configuration the phases of electrical power provided to various stator coils may be the same.

Figure 15:
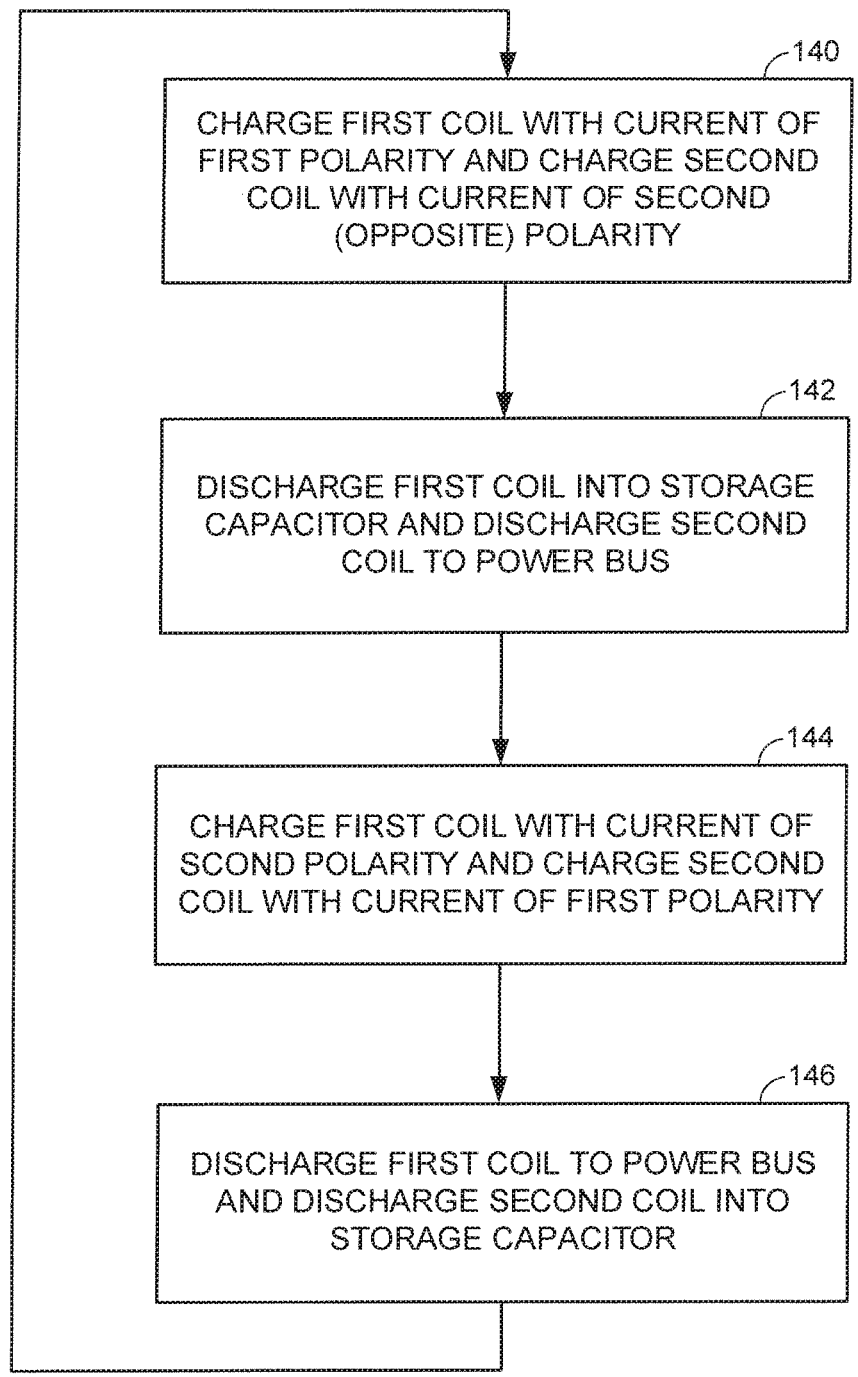
FIG. 15 schematically illustrates a sequence of steps which are taken in a method of one example embodiment.

FIG. 15 shows a sequence of steps which are taken in one example embodiment, illustrating how two driver circuits are operated according to an embodiment. Here, the two driver circuits may control operation of corresponding inductive coils that are coupled to a power bus at a common node as discussed above. The flow can be considered to commence at step 140 where in a first phase a first stator coil of a switched reluctance electrical motor is charged by one driver circuit with current of a first polarity from a power bus (e.g., coupled to a power supply) and a second stator coil is charged with current of a second (opposite) polarity from the storage capacitor of the second driver circuit. At step 142, in a second phase, both motor coils are discharged, the first stator coil being discharged into the storage capacitor of the first driver circuit and the second electrical motor coil is discharged to the common node. At step 144, in a third phase, both motor coils are charged again, but each in the opposite direction to the first phase. The first motor coil is charged with current of the second polarity from the storage capacitor of the first driver circuit and the second motor coil is charged with current of the first polarity from the common node. Finally at step 146, in a fourth phase, both motor coils are again discharged. The first motor coil is discharged to the common node and the second electrical motor coil is discharged into the storage capacitor of the second driver circuit.

Figure 16:
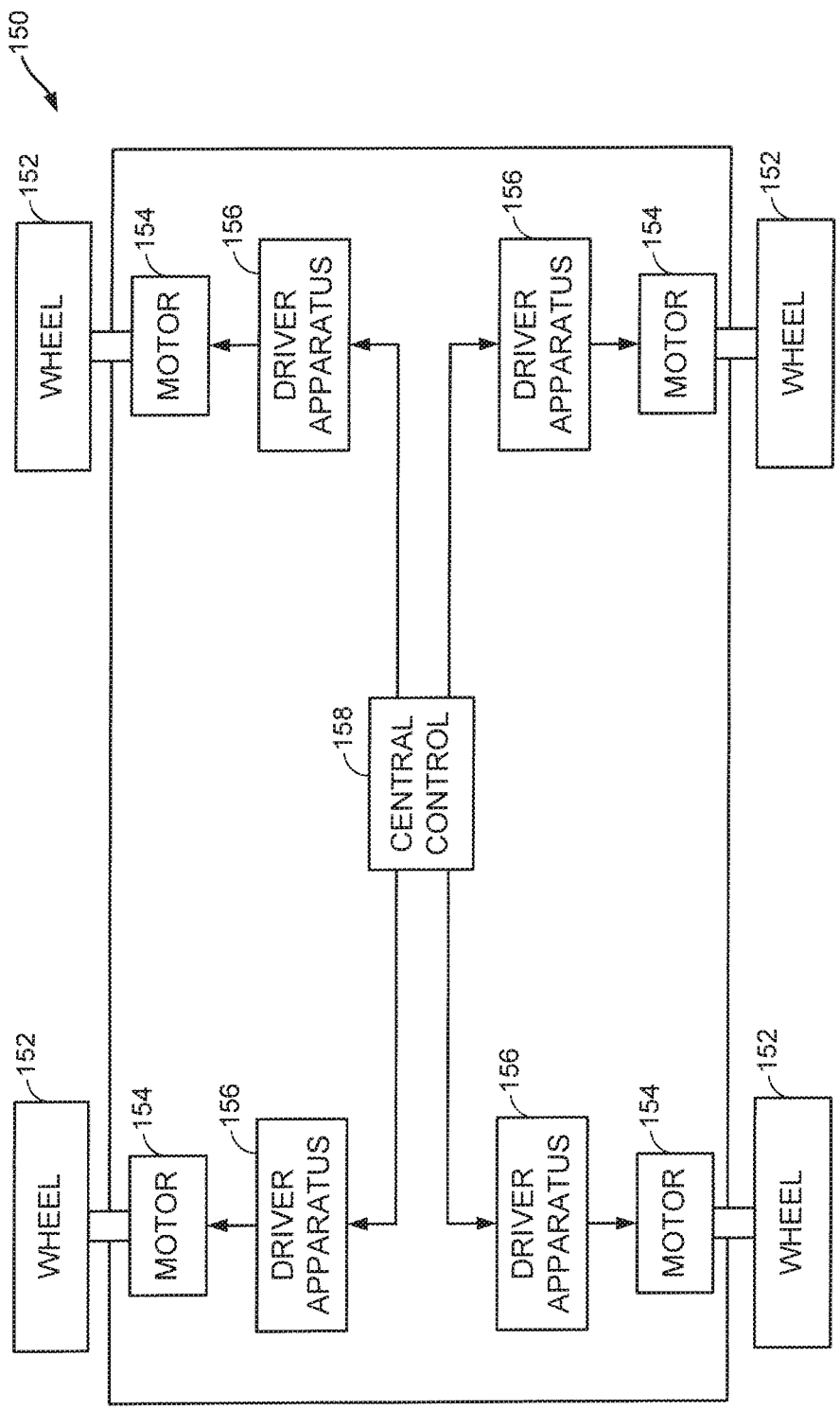
FIG. 16 schematically illustrates the motor system of one example embodiment used to power the wheels of a car in one particular example implementation.

FIG. 16 schematically illustrates an electric vehicle, say an automobile, in which an example embodiment of the electrical motor system is to be found. The vehicle 150 has four wheels 152, each driven by its own motor 154. Each motor 154 is driven by an associated driver apparatus 156, and overall control of the set of four driver apparatuses is maintained by a central control unit 158. Within each motor 154 the coil windings provided on each stator tooth are aluminum. In the context of a mobile vehicle, this is beneficial because aluminum is approximately three times lighter than copper and approximately five times cheaper (by weight), making it approximately fifteen times cheaper per area (making it cheap enough to be a replaceable wear item). In other embodiments the coil windings provided on each stator tooth may be copper, or any other suitably conductive metal.

Previously the choice of aluminum for the stator coil windings would have generally been rejected however, because aluminum's resistance is twice as high per cross sectional area, and because it fatigues with vibration more quickly than copper. However in an electrical motor system according to the present techniques, the current required in the coils is notably low and hence the power loss (according to $I^2R$) due to the higher resistance is of lesser significance. Indeed the higher value of R in fact makes the L/R time constant lower, and so the driver circuit operates faster.

Furthermore, the combination of the low cost of the motor and its flexibility of operation with respect to rotational speed means that it is practical in the example embodiment shown in FIG. 16 to provide an individual motor at each wheel, rather than one central motor with associated gearing and transmission. Placing such a "cheap" motor, using aluminum windings for the stator coils, at each wheel makes the motor accessible to be a replaceable item (in the manner of a brake pad, say) and the benefit of using the cheap aluminum can be realized.

It should be appreciated that such an arrangement is also possible, at least in part, due to the lessened importance of the magnetic energy transfer to the rotor from the coil here. This is due the fact that the present techniques mean that whatever magnetically stored energy that doesn't get magnetically transferred to the rotor from the coil can be recovered and reused. Where previously the air-gap between the coils and the rotor in the motor would have to be very small—e.g. a fraction of a millimeter—in order to maintain an acceptable efficiency (by good magnetic energy transfer from the rotor to the coil), this constraint on the size of the air-gap is more relaxed for the present motor system, due to the recycling of energy. In turn this means that the motor can be positioned in a much more exposed position, due to its greater tolerance for a more relaxed (and varying) air-gap.

Figure 17:
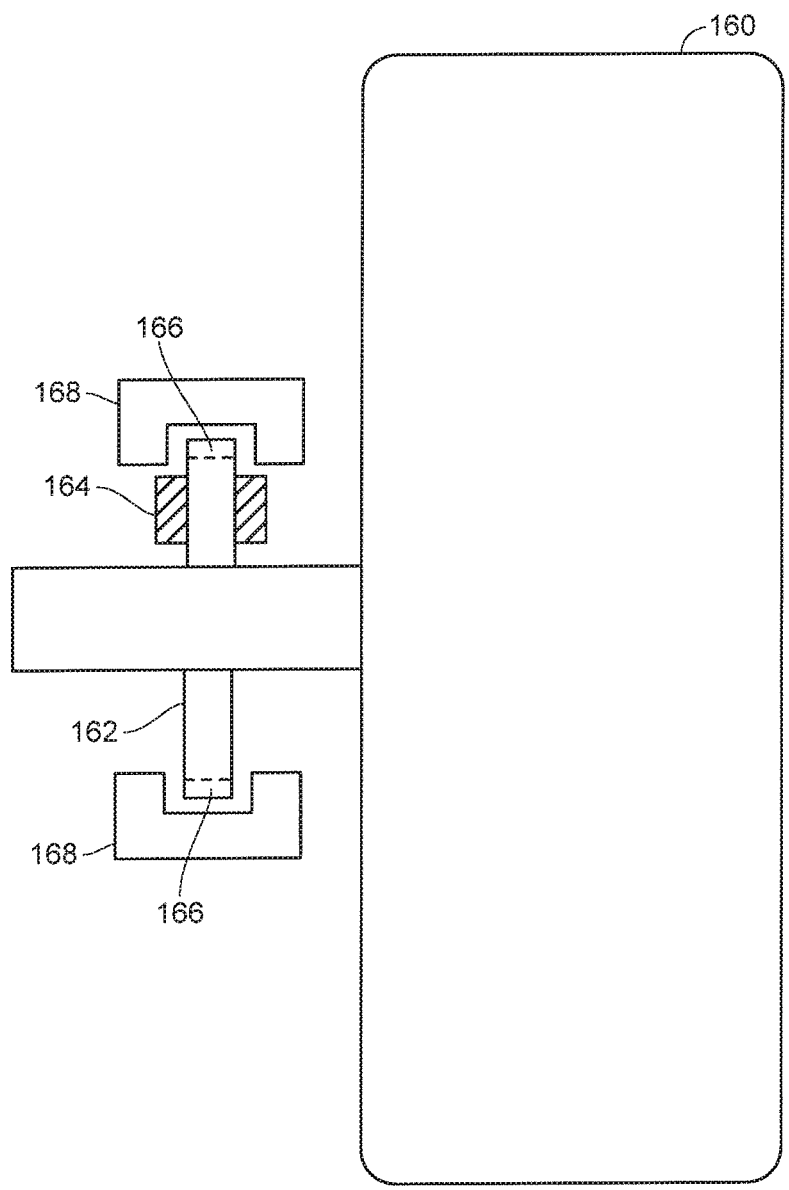
FIG. 17 schematically illustrates an example embodiment in which a motor system is provided by the adaptation of a brake disk in an automobile.

Indeed FIG. 17 illustrates an example motor embodiment in which an automobile wheel 160 has a brake disk 162 which has been adapted to form part of the motor. Brake pads 164 continue to perform the usual braking function through selective frictional application to the brake disk 162, but the outer edge 166 of the brake disk 162 has been adapted to provide the rotor portion (e.g. with molded fins or spokes to provide variable reluctance) of the motor. A surrounding part 168 provides the stator portion. Combining an "existing" component with the motor in this manner also has clear weight reduction advantages for the vehicle as a whole. Such an adaptation could also for example be made to other components of the general wheel assembly such as the steel rim or the brake drum. Previous switched reluctance motor designs would typically be unable to tolerate operation in this kind of exposed position, due to their fine sensitivity as regards the air-gap between the coils and the rotor in the motor, for example requiring the air-gap to be less than 0.5 mm, and the exposure of a relatively expensive motor in this manner would not normally be contemplated. However the present techniques: a) provide a considerably cheaper motor system which makes its own replacement a less significant cost factor; b) allow a lower current configuration which makes its construction out of cheaper, but more resistive materials (such as aluminum) more practical; and c) recycle the energy used, thus allowing an improved efficiency and making a precise and small coil to rotor air-gap less significant, e.g. allowing the air-gap to be greater than 1.0 mm.

In conclusion, it will be appreciated from the above description that the electrical motor system and its associated coil driver circuitry described herein enables the use of strong magnetic fields in the stator coils at low net power outputs by recycling the unused energy that isn't translated into rotational energy from those fields. With this capability and further by means of being able to disable groups of the stator coils the motor can be operated efficiently down to extremely low input levels. For example, a prototype 750 W (1 HP) motor constructed according to the described principles has been operated across its full range of output speeds with input power levels as low as 15.0 W (e.g., 50 times lower than its design power level). This capability, in addition to operating the motor at low rotational speeds (facilitated by the large number of phases and rotor teeth) allows the motor to operate efficiently at a wide variety of output levels, which may obviate the need for a gearbox and/or transmission in various systems.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

What is claimed is:

1. An electrical motor comprising:
   motor driver circuitry;
   a power bus to comprise a common node, wherein the power bus to maintain a direct current (DC) power voltage at the common node;
   a plurality of coils, two or more of the plurality of coils to comprise first terminals coupled to the motor driver circuitry and second terminals coupled to the common node; and
   a power supply to supply the DC power voltage, the power supply to comprise a first terminal coupled to the common node and a second terminal coupled to the motor driver circuitry,
   wherein a peak magnitude of a current to flow into a single coil of the two or more of the plurality of coils to be greater than a peak magnitude of a current to flow between the common node and the power supply.

2. The electrical motor of claim 1, and further comprising at least one first wire to connect the first terminal of the power supply to the common node and a plurality of second wires to connect the common node to the second terminals of the coils.

3. The electrical motor of claim 1, the electrical motor further to comprise a rotor and a stator, and wherein the plurality coils to be formed as windings on teeth of the stator.

4. The electrical motor of claim 1, wherein the motor driver circuitry to comprise a plurality of capacitors to store charge responsive to current to flow through the coils from the common node and discharge charge current through the coils into the common node.

5. The electrical motor of claim 1, wherein the plurality of coils to comprise at least a first coil and a second coil to be approximately simultaneously charged or discharged, the first coil to be charged or discharged in a first direction with respect to the common node and the motor driver circuitry, and the second coil to be charged or discharged in a second direction, opposite the first direction, with respect to the common node and the motor driver circuitry.

6. The electrical motor of claim 4, wherein at least one of the capacitors to store charge from current to flow from the common node responsive to a boost cycle and to discharge to supply current to flow into the common node responsive to a buck cycle.

7. The electrical motor of claim 4, wherein at least a first of the plurality of capacitors to store charge responsive to a first current to flow through a first coil from the common node, and wherein a second of the plurality of capacitors to discharge through a second coil to supply a second current to the common while the first current is flowing from the common node.

8. The electrical motor of claim 6, wherein the at least one of the capacitors to store charge from the current to flow from the common node responsive to removal of a boost signal.

9. The electrical motor of claim 7, wherein the second current to flow to the common node to offset at least a portion of the first current to flow from the common node.

10. The electrical motor of claim 8, wherein at least one of the plurality of coils to charge responsive to application of the boost signal and discharge responsive to removal of the boost signal.

11. A method comprising:
coupling a voltage source to a common node of a power bus from a first terminal of a direct current (DC) power supply, wherein the power bus to maintain a DC power voltage at the common node; and
conducting a bi-directional current between first and second terminals of two or more of a plurality of coils, first terminals of the two or more of the plurality of coils to be coupled to motor driver circuitry and second terminals of the two or more of the plurality of coils to be coupled to the common node,
wherein a peak magnitude of a current flowing into a single coil of the two or more of the plurality of coils to be greater than a peak magnitude of a current flowing between the common node and the DC power supply.

12. The method of claim 11, wherein conducting the bi-directional current between first and second terminals of the two or more of the plurality of coils further comprises:
storing charge in capacitors responsive to the bi-directional current flowing in the coils in a first direction; and
discharging capacitors responsive to the bi-directional current flowing in the coils in a second direction.

13. The method of claim 11, wherein a peak magnitude of current between the voltage source and the common node to be less than one half a peak magnitude of the bi-directional current.

14. The method of claim 12, wherein storing charge in capacitors further comprises storing charge in at least one of the capacitors from current flowing from the common node responsive to a boost cycle, and wherein discharging capacitors further comprises discharging the at least one of the capacitors to supply current flowing into the common node responsive to a buck cycle.

15. The method of claim 12, wherein storing charge in capacitors further comprises storing charge in at least a first of the plurality of capacitors responsive to a first current flowing through a first one of the plurality of coils from the common node, and wherein the method further comprises discharging at least a second of the plurality of capacitors through a second one of the plurality of coils to supply a second current to the common while the first current is flowing from the common node.

16. The method of claim 14, wherein storing charge in the at least one of the capacitors further comprises storing charge in the at least one of the capacitors from the current flowing from the common node responsive to removal of a boost signal.

17. The method of claim 15, wherein the second current flowing to the common node to offset at least a portion of the first current flowing from the common node.

18. The method of claim 16, and further comprising:
charging at least one of the plurality of coils responsive to application of the boost signal; and
discharging the at least one of the plurality of coils responsive to removal of the boost signal.

19. A controller device comprising:
a plurality of first terminals, two or more of the first terminals to couple two or more of a plurality of coils corresponding to the two more of the first terminals;
one or more second terminals to couple to a direct current (DC) power supply; and
motor driver circuitry to control current to flow between the one or more second terminals and the two or more of the plurality of first terminals so as to enable coupling of second terminals of the two or more of the plurality of coils to a common node maintained at a DC power voltage by the DC power supply to operate a motor,
wherein a peak magnitude of a current to flow into at a single coil of the two or more of the plurality of coils to be greater than a peak magnitude of a current to flow between the common node and the DC power supply.

20. The controller device of claim 19, wherein the motor driver circuitry to comprise a plurality of capacitors to store charge responsive to current to flow through the coils from the common node and discharge charge current through the coils into the common node.

* * * * *